April 29, 1941.  W. T. GOLLWITZER  2,239,847
MACHINE TOOL
Filed Dec. 13, 1938   13 Sheets-Sheet 5
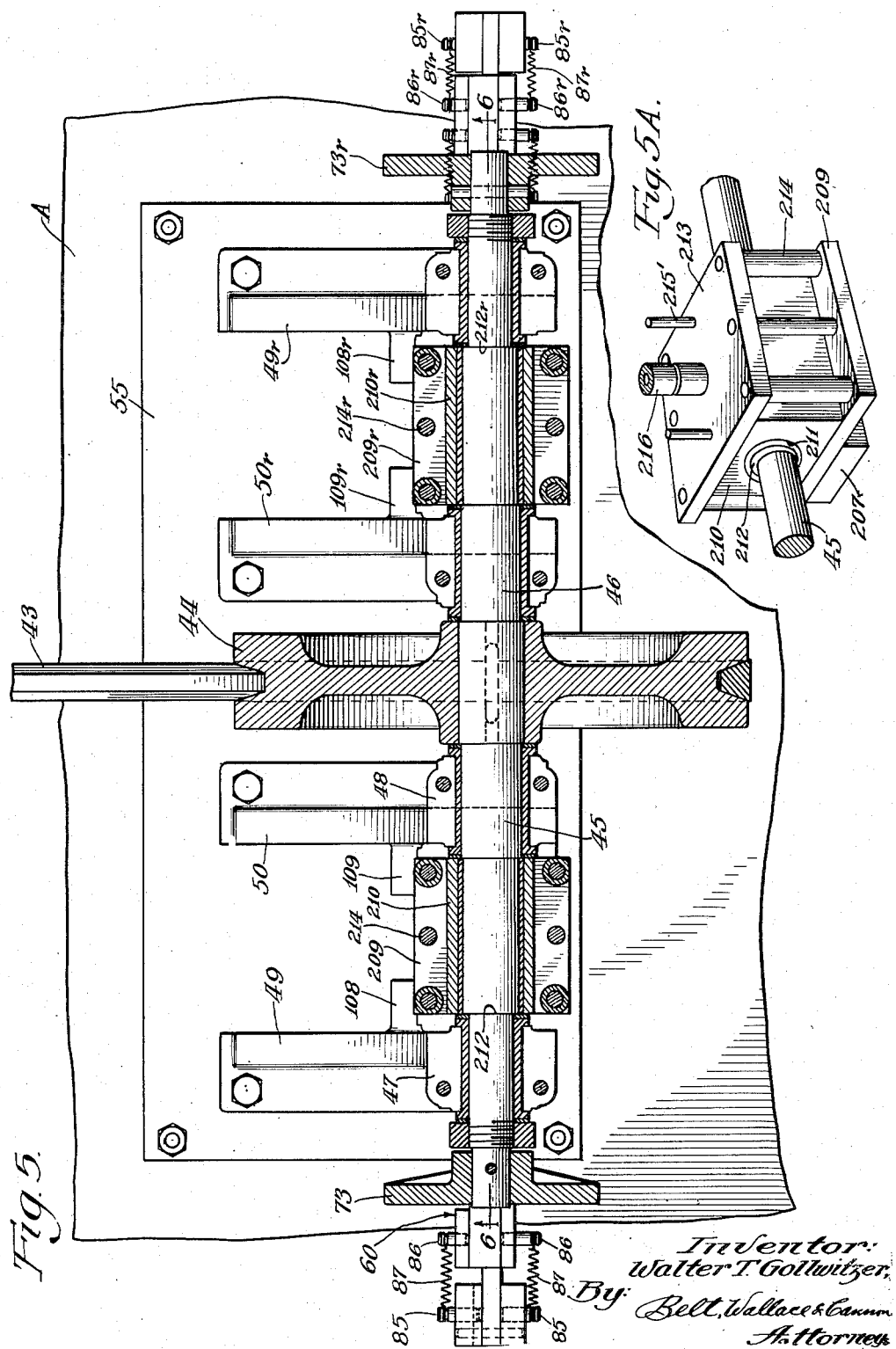

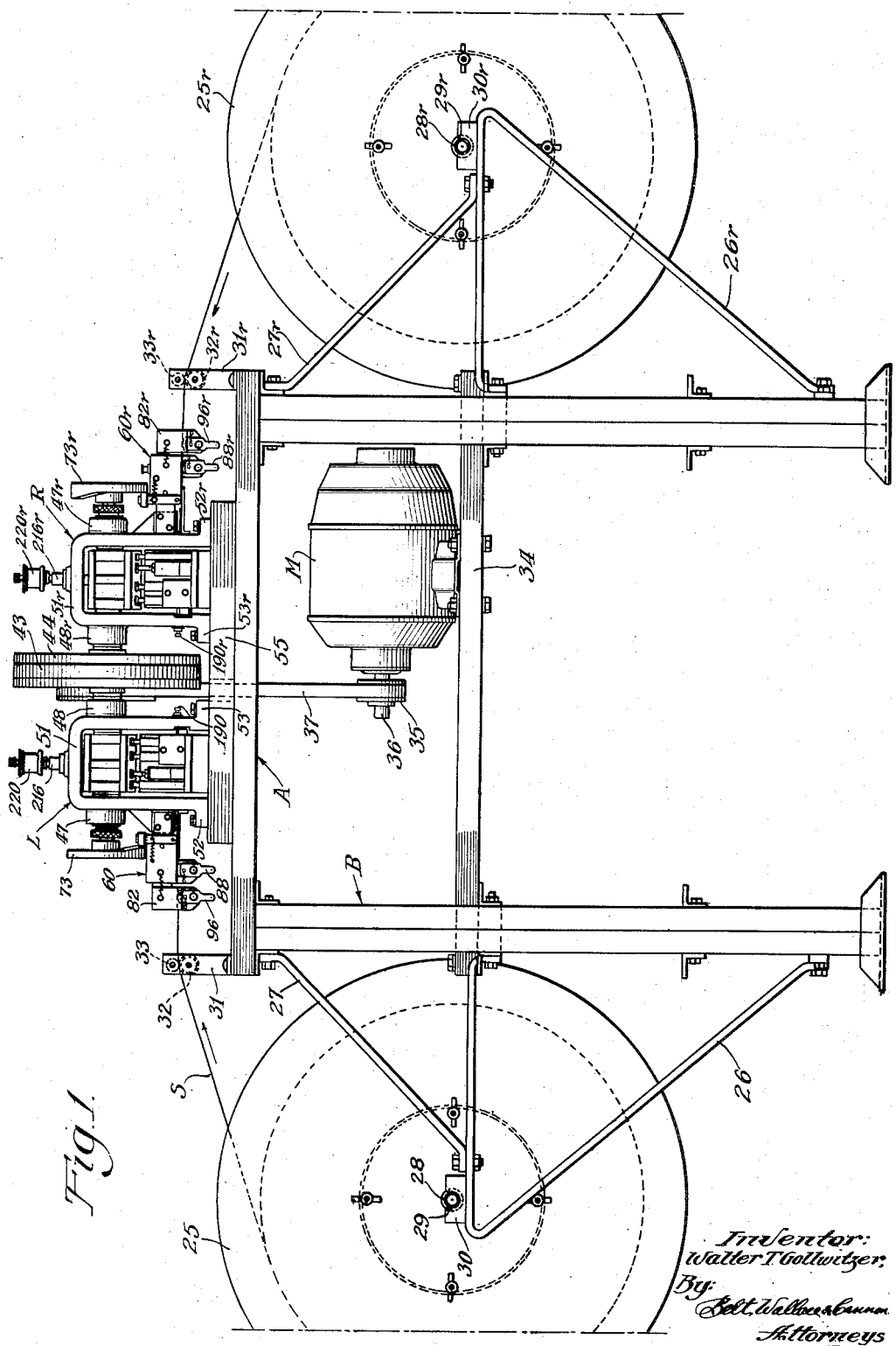

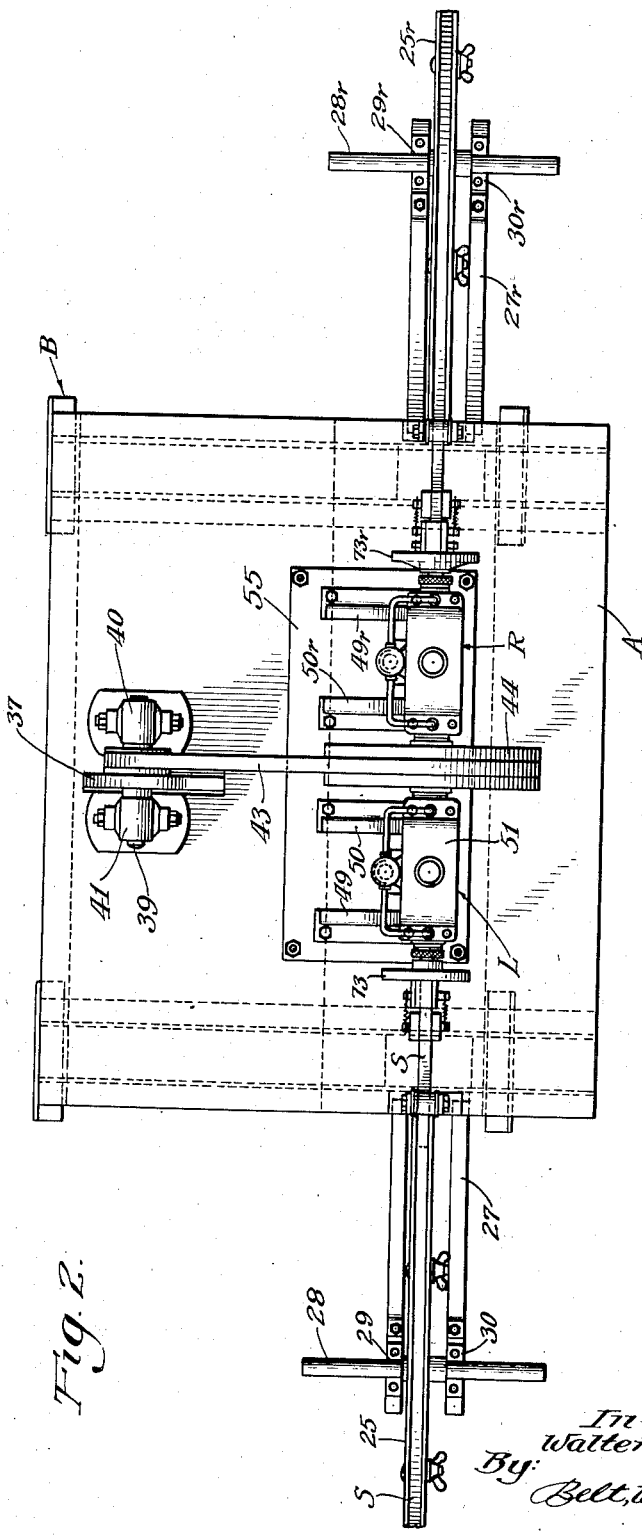

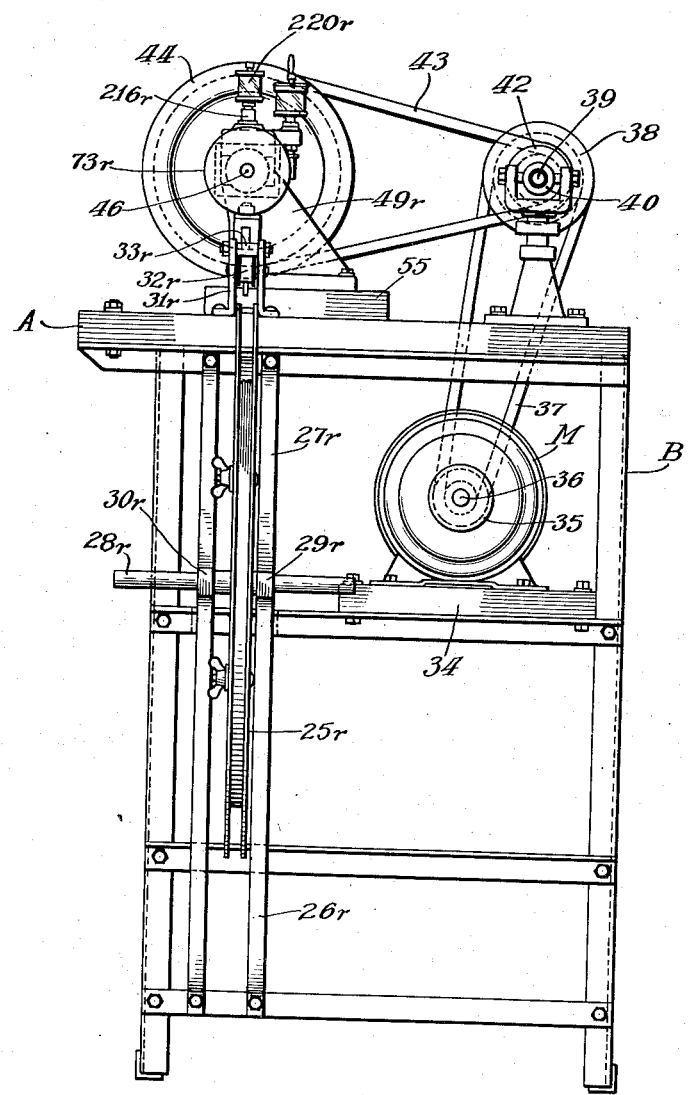

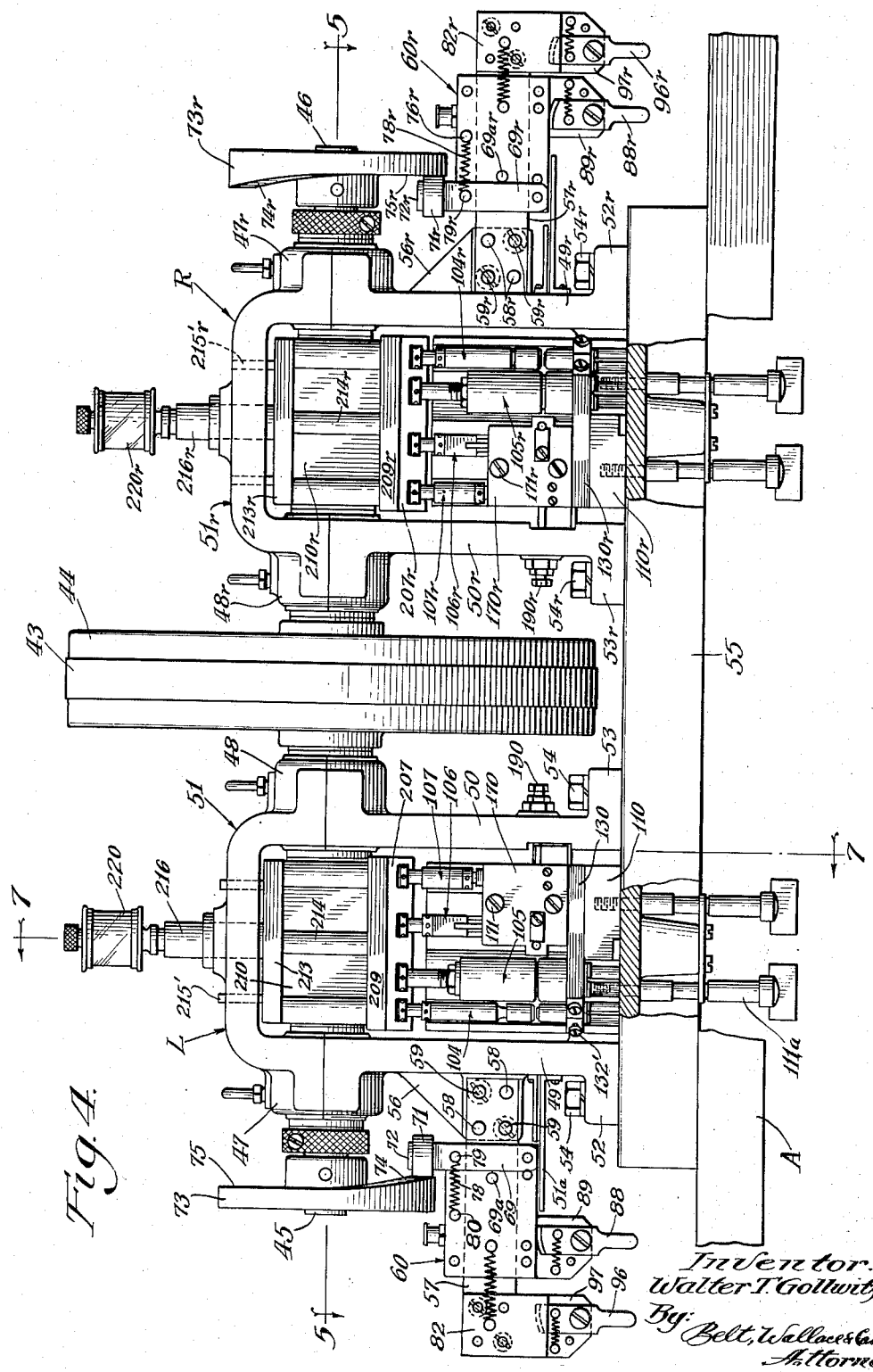

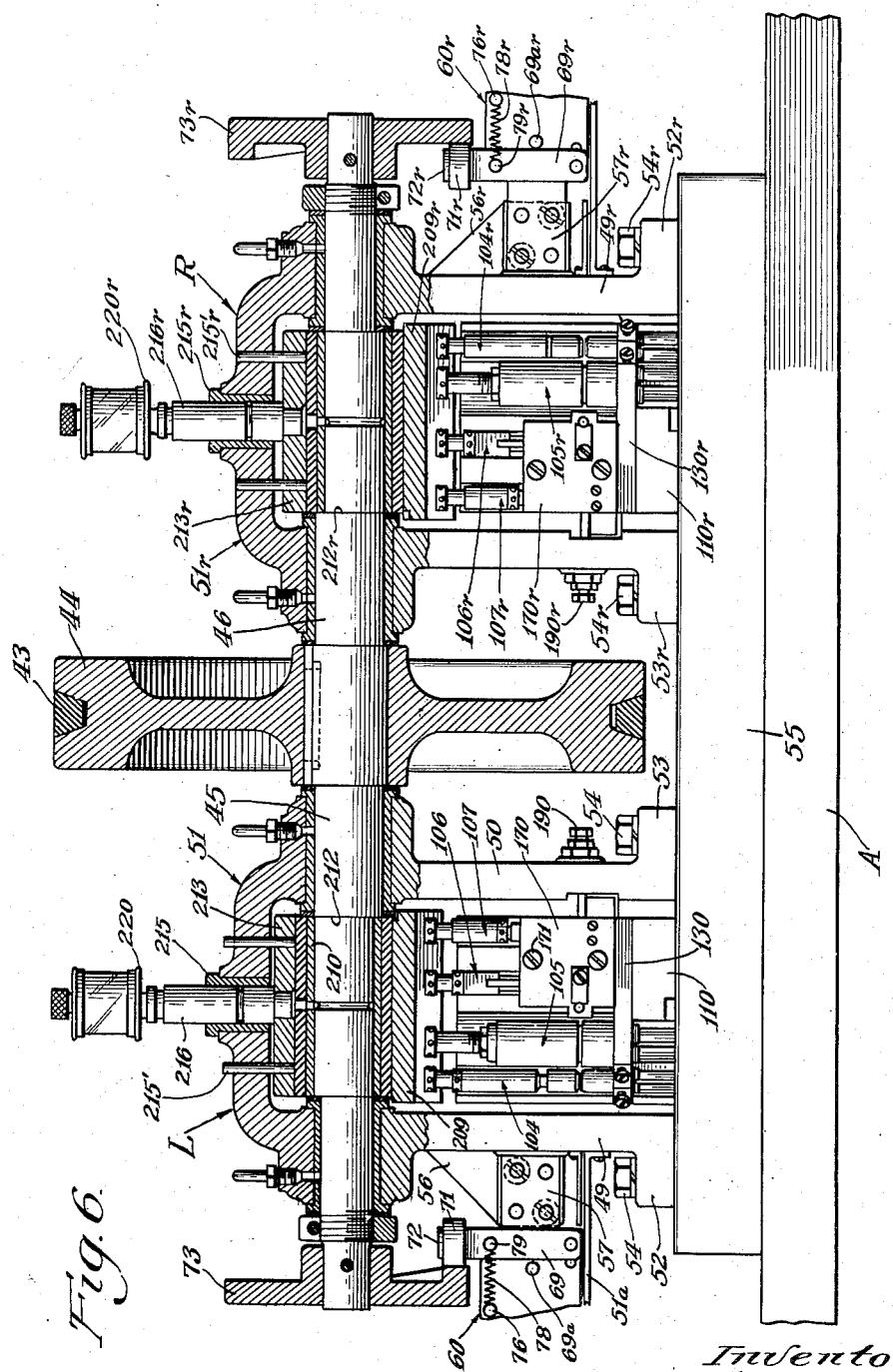

April 29, 1941.    W. T. GOLLWITZER    2,239,847
MACHINE TOOL
Filed Dec. 13, 1938    13 Sheets-Sheet 7
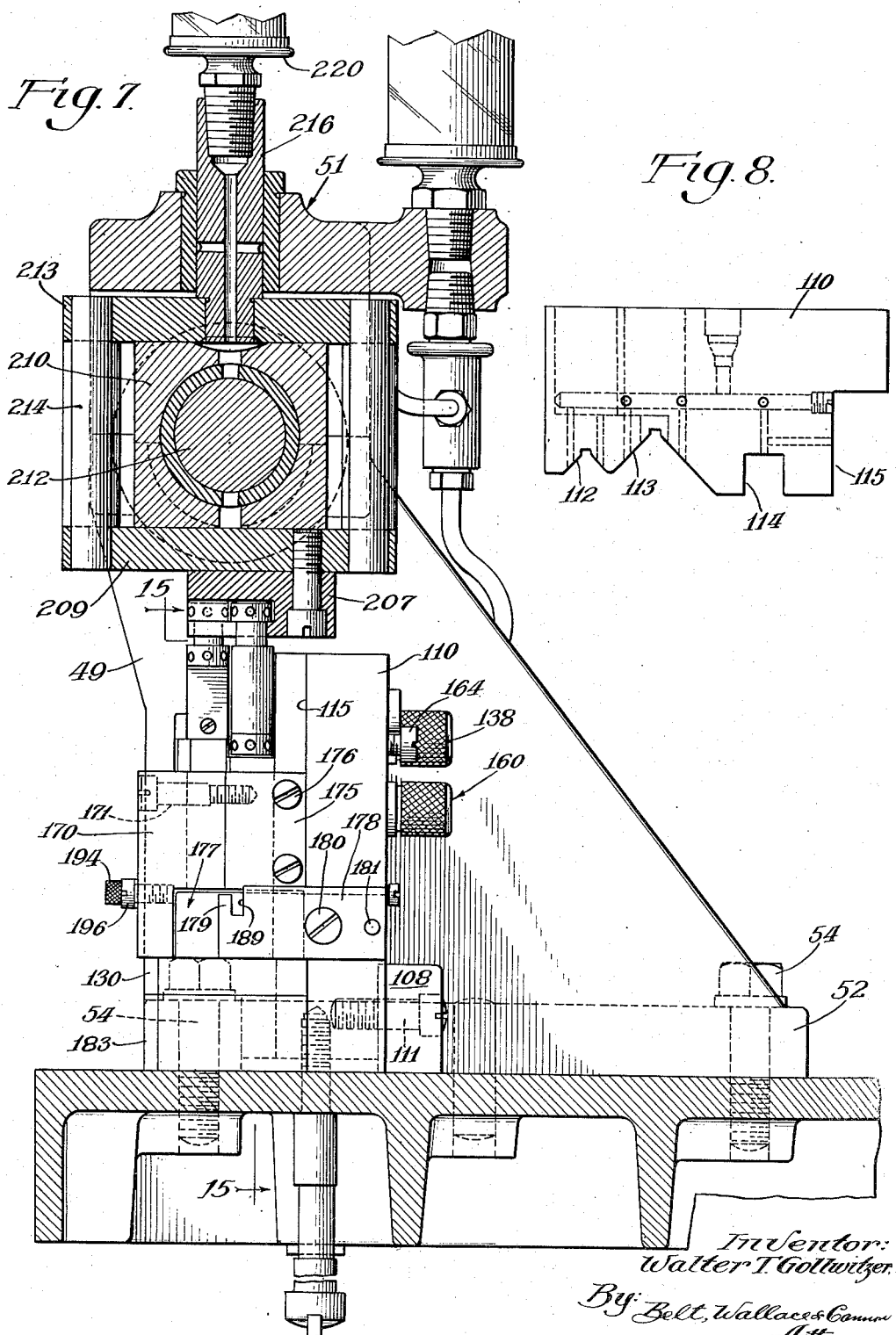
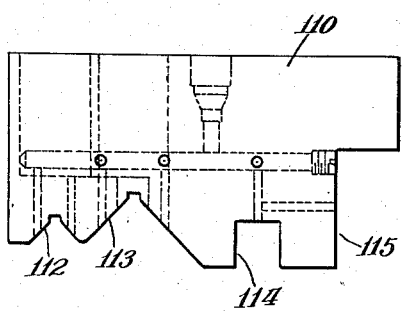
Inventor:
Walter T. Gollwitzer
By Belt, Wallace & Connor
Attorneys April 29, 1941. W. T. GOLLWITZER 2,239,847
MACHINE TOOL
Filed Dec. 13, 1938 13 Sheets-Sheet 8

Inventor:
Walter T. Gollwitzer,
By Belt, Wallace & Cannon
Attorneys

April 29, 1941.  W. T. GOLLWITZER  2,239,847
MACHINE TOOL
Filed Dec. 13, 1938   13 Sheets-Sheet 9
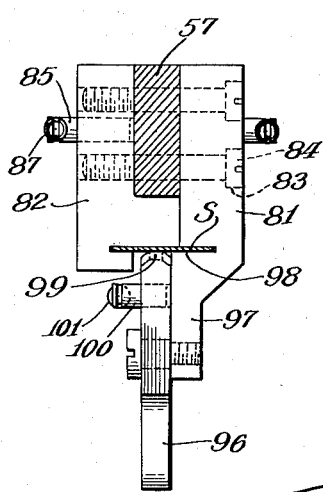
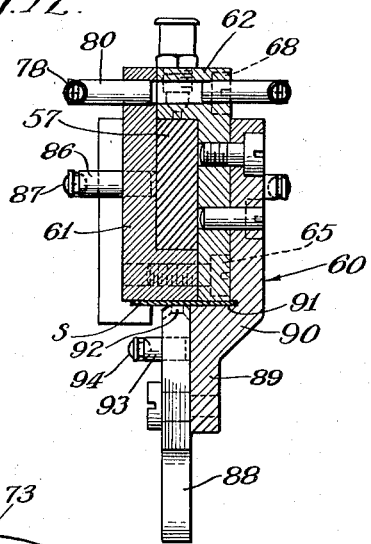
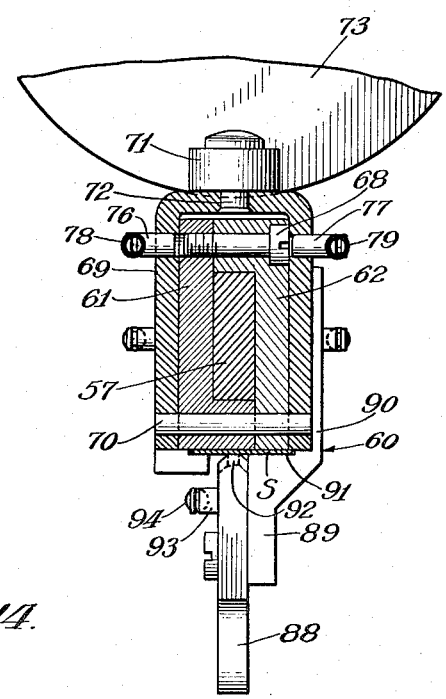
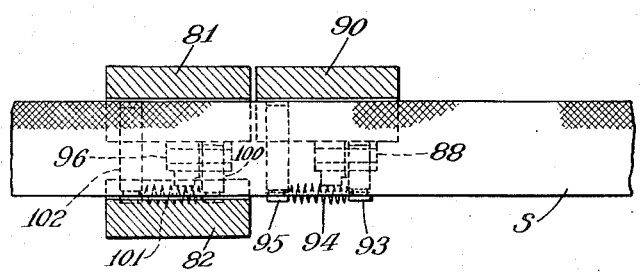
Inventor:
Walter T. Gollwitzer,
By Belt, Wallace & Cannon
Attorneys.

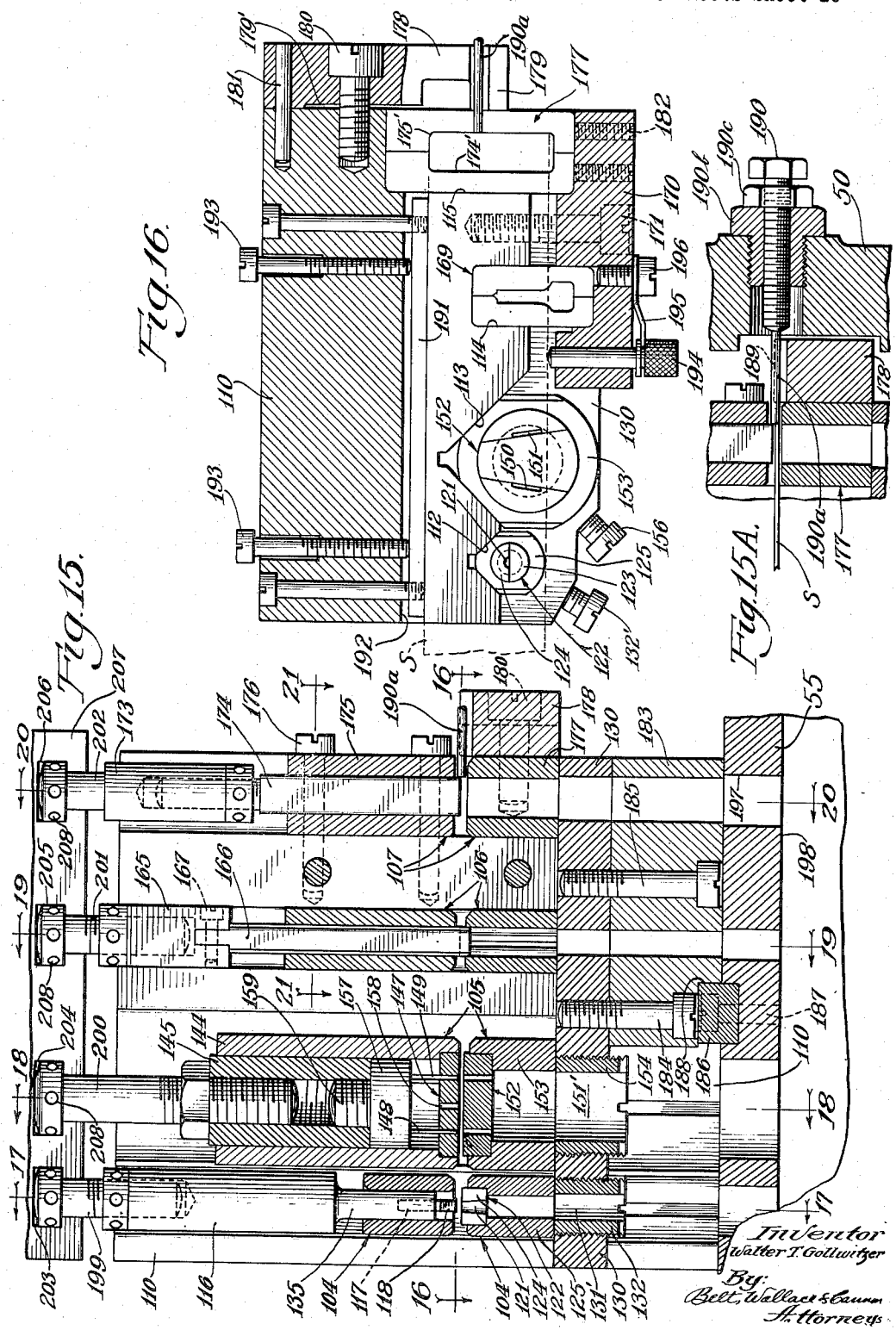

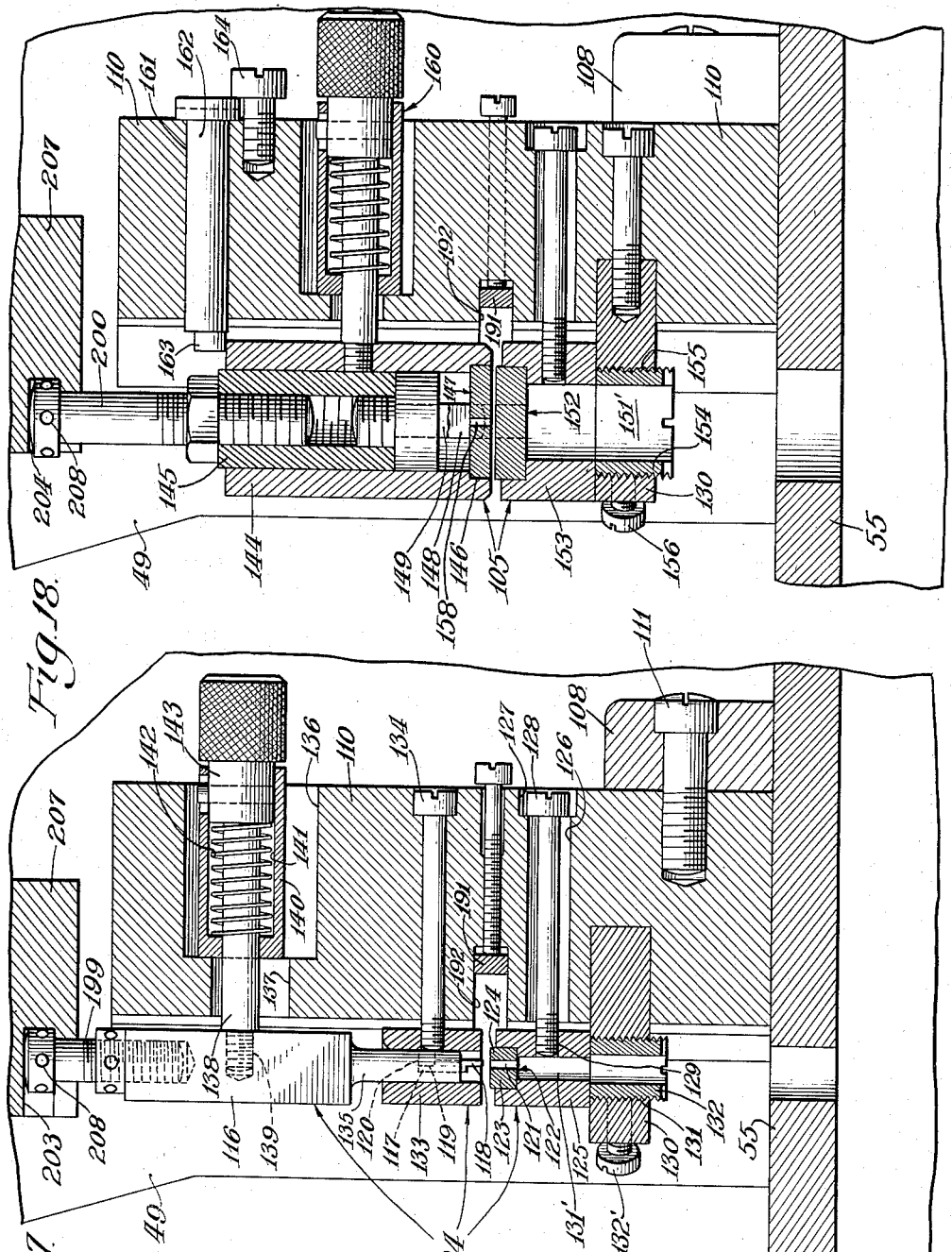

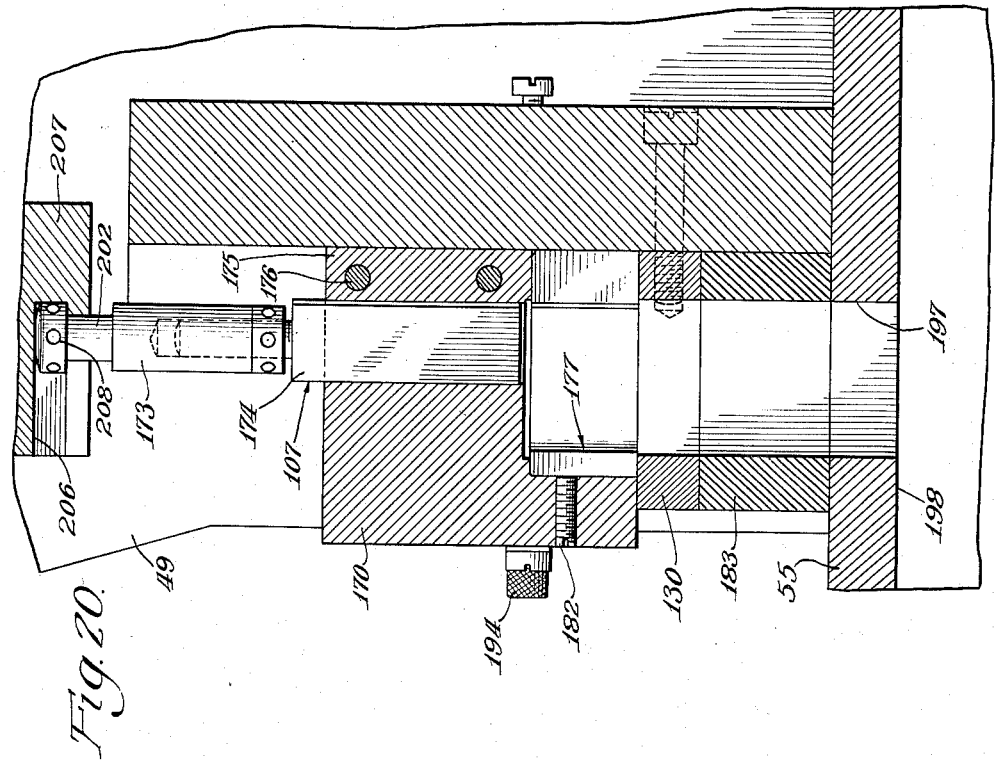
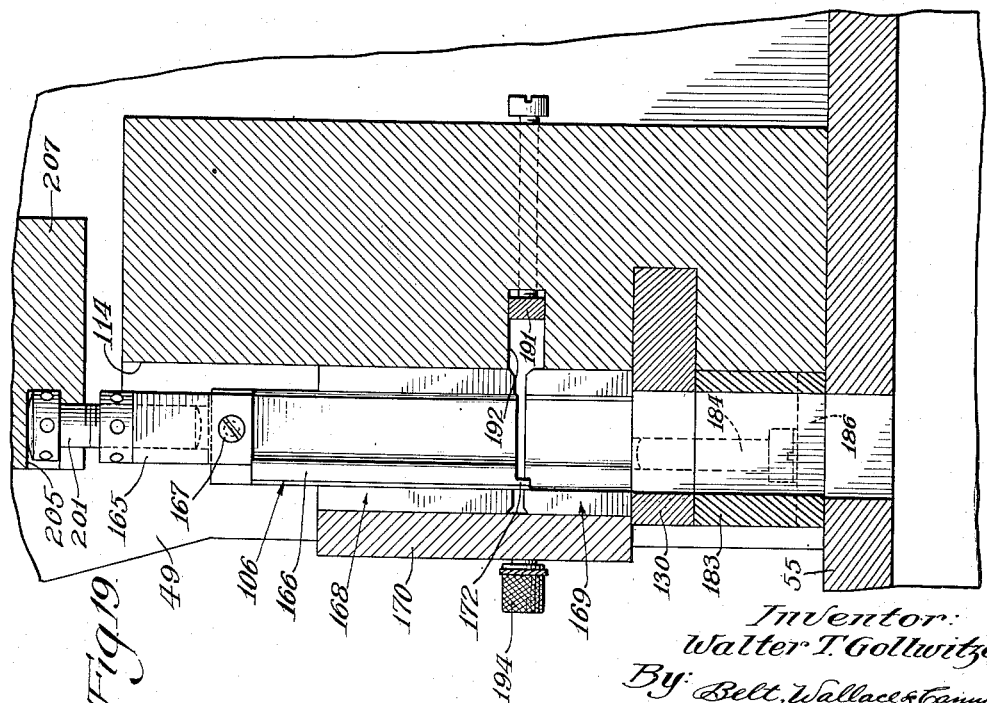

April 29, 1941.  W. T. GOLLWITZER  2,239,847
MACHINE TOOL
Filed Dec. 13, 1938   13 Sheets—Sheet 13

Inventor:
Walter T. Gollwitzer,
By: Belt, Wallace & Cannon
Attorneys.

Patented Apr. 29, 1941

2,239,847

UNITED STATES PATENT OFFICE 2,239,847

MACHINE TOOL

Walter T. Gollwitzer, Euclid, Ohio, assignor to Addressograph-Multigraph Corporation, Wilmington, Del., a corporation of Delaware Application December 13, 1938, Serial No. 245,539

21 Claims. (Cl. 164—48)

This invention relates to machine tools and more particularly to tools adapted for the rapid production of relatively small but usually difficult products. Letters Patent of the United States, No. 2,049,439, discloses an index tab for use on printing devices such as are employed in addressing and similar series printing machines, and the illustrated form of my invention is adapted for the production of such index tabs which it will be understood are merely exemplary of products such as can be produced by my novel machine tool.

My invention primarily relates to expediting the performance of perforating, slitting, notching, cropping and like operations which are often entailed in the production of small but difficult products such as the index tab referred to above and heretofore such operations have been performed in standard punch presses which required the use of relatively large, heavy and expensive punches and dies or similar devices.

One of the primary reasons that small products such as the aforesaid index tab have been produced in standard punch presses by the use of large dies or the like is that usually such products require that a relatively high degree of accuracy be maintained. Heretofore it has not been possible to obtain this high degree of accuracy by the use of relatively small devices and moreover the punch presses in which such products were produced were not adapted to operate with small devices.

Thus the primary object of my invention is to expedite the production of relatively small but usually difficult products entailing accurate operations, and more specifically to enable the use of relatively small devices capable of rapid operation but which are nevertheless so constructed and arranged that the high degree of accuracy usually required in the production of small but difficult products may be realized.

Frequently small difficult products, of which the index tab shown in the above referred to Patent No. 2,049,439 is an example, are made from hardened material such as spring steel, and it will be obvious that perforating, slitting, notching, cropping or like tools operative on such material are dulled more rapidly than corresponding tools which operate on softer material. Furthermore, it is usually necessary that small difficult products be free of burrs and other objectionable conditions which arise when the tools used in the production thereof become dulled. Because of these and kindred conditions it is customary to sharpen rather frequently the tools employed in the production of products such as are described above. In the past where small difficult products have been produced in standard punch presses by the use of relatively large punches and dies or the like, it has been an arduous task to remove the perforating, slitting, notching, cropping or like tools included in the punches, dies and the like when these become dulled especially because of the size of the devices entailed and the manner in which such tools were mounted in the punches and dies and the like and also the manner in which such devices were mounted in standard punch presses.

Thus, in view of the foregoing, still another important object of this invention is to facilitate installation and removal of perforating, slitting, notching, cropping and like tools so as to expedite removal and replacement thereof when the tools become dulled in the course of use thereof or require replacement for other reasons.

As is well understood in the art, it is necessary that operations such as punching, slitting, notching, cropping and the like be carried out in such a way that the material adjacent the place whereat an operation is being performed or is otherwise being operated upon be effectively supported for otherwise the material may give in the course of an operation which will of course impair the accuracy of the operation, or the material may be permanently flexed or otherwise impaired which would of course render the products useless. Furthermore, where small difficult products are being produced it is usually customary to perform the various operations entailed in the production thereof progressively and such progressive operations are commonly planned to occur in such a way that the maximum support will be afforded for that part of material on which an operation is being performed. In the past relatively large, heavy and expensive punches and dies and like devices have enabled this to be attained for by the use of such devices it was possible to perform progressive operations in such a way that the materials would be properly supported and hence the desired degree of accuracy could be realized and the production of defective products avoided.

However, a further and salient object of this invention is to enable the operations entailed in the production of small difficult products to be performed progressively without requiring the use of large, heavy expensive tools and dies and the like, and an object ancillary to the foregoing is to effectively support the material from which such products are produced in such a way that the progressive formation of small difficult products, such as the aforesaid index tabs, may be brought about expeditiously with the production of defective products reduced to a minimum.

Still other objects of this invention are to accurately space and operate the operative portions of a machine tool so as to insure the production of accurate work; to arrange punches and dies or the like that are adapted to perform progressive or successive operations in the course of production of a product in such a way that the product may be accurately produced in a rapid manner; to arrange such punches and dies or the like for simultaneous operation, and an object ancillary to this is to accurately advance the material from which the products are being produced from one operative position to another, whereat operations are to be performed thereon, so that the various operations will be performed accurately at the proper places on the material; and to provide an arrangement wherein but a single feeding means is required to advance material through a plurality of devices adapted to operate thereon in the course of the production of small difficult products.

Yet further objects of the invention are to provide for expeditious replacement of those parts of perforating, slitting, notching, cropping and like devices that will wear out in the course of use thereof; to insure accurate mounting of those parts that need be removed and replaced as for the purpose of sharpening and the like; and to accurately secure operative parts in position by forming the retaining means therefor in situ.

Other and further objects will be apparent from the following description wherein reference is made to the accompanying drawings in which Fig. 1 is a front elevation of a machine constructed in accordance with my invention;

Fig. 2 is a top plan view of the machine;

Fig. 3 is a view looking in at the right-hand end of the machine as it is viewed in Fig. 1;

Fig. 4 is a fragmentary front elevation, drawn to an enlarged scale, of operative portions of the machine shown in Fig. 1 and in which certain parts are broken away;

Fig. 5 is a horizontal sectional view taken on the line 5—5 on Fig. 4.

Fig. 5A is a perspective detail view of the drive for operative mechanisms included in the machine;

Fig. 6 is a vertical longitudinal sectional view taken substantially on the line 6—6 on Fig. 5;

Fig. 7 is a vertical transverse sectional view taken substantially on the line 7—7 on Fig. 4;

Fig. 8 is a plan view of a guide block employed in the machine;

Figure 9:
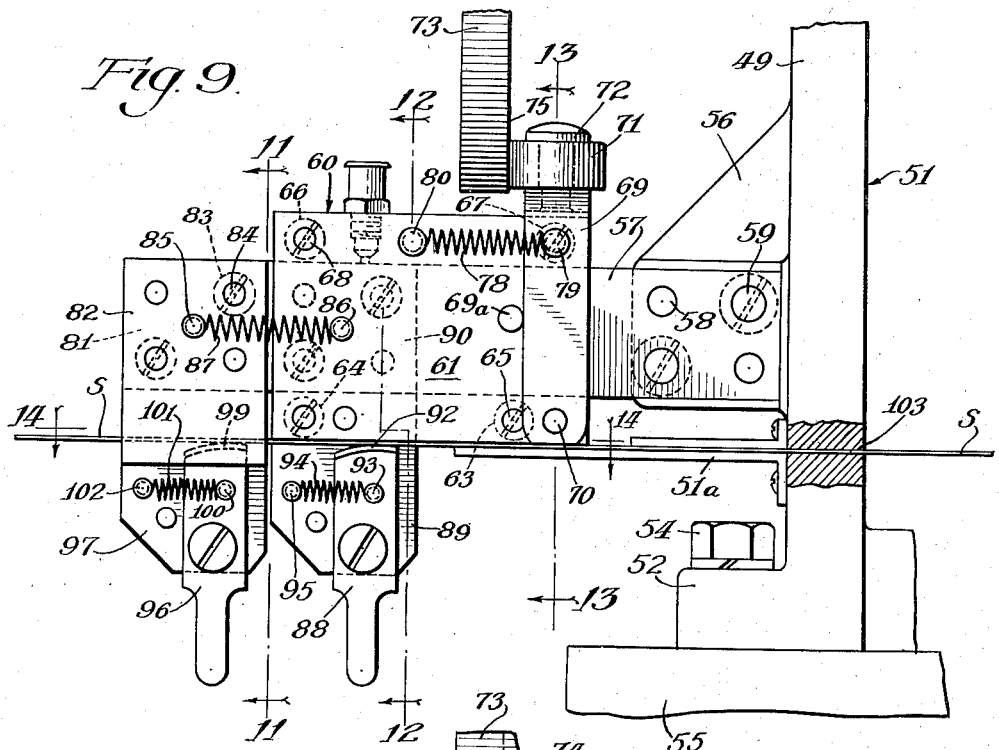
Fig. 9 is a view, drawn to an enlarged scale, of the material feeding means that also appears at the left-hand end of Figs. 1 and 4.

Figs. 11, 12, 13 and 14 are sectional detail views taken substantially and respectively on the lines 11—11, 12—12, 13—13 and 14—14 on Fig. 9;

Fig. 15 is a sectional detail view taken substantially on the line 15—15 on Fig. 7.

Figure 22:
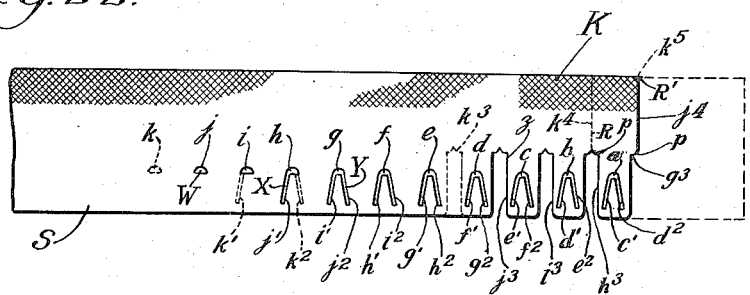
Figure 23:
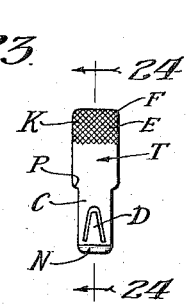
Figure 24:
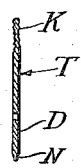

Fig. 15A is a sectional detail view of an adjustable stop employed in the machine;

Figs. 16, 17, 18, 19, 20 and 21 are sectional detail views taken substantially and respectively on the lines 16—16, 17—17, 18—19, 19—19, 20—20 and 21—21 on Fig. 15;

Fig. 22 is a fragmentary elevational view of the strip material and showing the manner in which the successive operations effected in the machine are carried out as the material progresses through the machine;

Fig. 23 is an elevational view of a typical product produced in the machine; and Fig. 24 is a sectional detail view taken substantially on the line 24—24 on Fig. 23.

Inasmuch as my novel machine is entirely automatic in operation and since one of the important objects of the invention is to effect rapid production of small difficult products such as the aforesaid index tabs for printing devices and the like, I have constructed my novel machine so as to embody two heads that are identical in construction and operation except as to the order in which the operative parts are arranged therein and in the course of operation of the machine each head is operative to effect production of the products. One of the heads, positioned at the right-hand side of the machine and indicated by R, is referred to hereinafter as the right-hand head and the other of the heads, positioned at the left-hand side of the machine and indicated by L, is referred to hereinafter as the left-hand head. It is the left-hand head L that is shown in the detail views and for this reason this head is explained in full and thereafter the distinctions between this head and the head R are explained.

Both of the heads L and R are mounted on a table A that includes a stand generally indicated by B which, in the present instance, comprises four legs that are adapted to be rested on a floor or other suitable support to so dispose the table A that the heads L and R mounted thereon are in a position convenient to the operator of the machine.

In the present instance the machine is arranged to produce tabs T, Figs. 23 and 24, from suitable strip material such as spring steel, a strip of such material being indicated by S in the accompanying drawings. Such strip material is sized to be of such width that it is equal to the over-all height or length of the product, as the tab T, and, of course, material is selected that is of a thickness equal to the desired thickness of the product as the tabs T.

The tabs as T, Figs. 23 and 24, that are produced by the illustrated machine each has the upper part of the body E thereof knurled as indicated at K and the lower ends of the stems C thereof chamfered as indicated at N, that is, the sharp corners of the lower end of the stem are cut away to prevent the stem digging into the material or body of the printing device or the like when the tab is being installed in its position of use. Moreover, the tabs are preferably made of hard material such as spring steel. Thus, where products are to have portions, such as those indicated by K and N on the tab T, which can best be produced when the material is soft, such portions are first formed in the material or raw stock which is thereafter hardened and where the material, as it is in the present instance, is in strip form it is wound onto spools as 25 which are thereafter so supported on the stand B that the strip material S may be withdrawn therefrom and fed through the machine in the course of operation thereof.

Such support is afforded in the present instance by a pair of brackets as 26, Figs. 1, 2 and 3.

Each of these brackets extends outwardly at the left-hand end of the stand B and preferably suitable braces as 27 are provided to insure that the brackets 26 afford a rigid support for the spool 25 that is mounted between the brackets and which includes an axle 28 that is adapted to be rested in bifurcations as 29 opening through the upper surfaces of blocks as 30 carried by the brackets 26. In this way such a support is provided that upon exhaustion of the supply of strip material from one spool another and filled spool may be conveniently substituted, which is, of course, conducive to rapid operation of the machine.

In the present instance a bracket 31 is mounted at the left-hand end of the table A and a flanged roller 32 is rotatably mounted thereon in cooperating relation with a retaining roller 33 that extends between the flanges on the roller 32 and which has the periphery thereof so spaced from the periphery of said roller 32 that the strip material S from the spool 25 may be fed through the bight between these rollers. This arrangement serves to guide the strip material to the operative parts in the head L.

Power for driving the operative parts included in both the heads L and R is, in the present instance, derived from an electric motor M, Fig. 1, secured to a shelf 34 mounted on the stand B below the table A, this motor having a pulley 35 fast on the drive shaft 36 thereof. A belt 37 is passed about the pulley 35 and also about a pulley 38, Fig. 3, fast on the jack shaft 39 journaled in bearings 40 and 41, Fig. 2, fast to the top of the table A rearwardly of the heads L and R. Another pulley 42 on the jack shaft 39 and fast to the pulley 38 has a belt 43 passed thereabout and this belt also passes about a pulley 44, Fig. 5, that is keyed to the drive shaft 45 of both the heads L and R, the drive shaft 45 being journaled in bearings 47 and 48 provided on opposite legs 49 and 50 of the substantially U-shaped frame 51, Fig. 4 of the head L, this U-shaped frame being mounted in inverted position. The legs 49 and 50 respectively include pads 52 and 53 through which bolts as 54 are passed to secure these pads and therefore the frame 51 to a bed 55 for the heads L and R, this bed being fast to the upper side of the table A. The operative parts in the heads L and R are set in operation by closing circuit to the motor M by operation of a suitably located switch (not shown) whereupon the drive shaft 45 is set in operation.

The head L has suitable means provided at the left-hand side thereof for advancing the strip S in a step by step manner. In the present instance such feeding means are carried by a pad 56, Fig. 4, that is provided on the outer side of the leg 49 of the frame 51. The entire strip material feeding means is mounted on an elongated slide plate 57 which has one end thereof suitably secured to the pad 56 by locating pins 58 and clamp bolts 59, the plate 57 having openings therein through which the locating pins 58 are passed when the plate is mounted on the pad 56 and the clamp bolts as 59 freely pass through other openings in this plate and are threaded into tapped openings in the pad 56. This arrangement rigidly supports the plate 57.

The strip material feeding means includes a carriage generally indicated by 60, Figs. 4, 9 and 12, which has a substantially L-shaped member 61, Fig. 12, the inner face of the stem of which is rested against the front side of the plate 57 and the upwardly disposed face of the foot portion of which is rested against the underside of the plate 57. The carriage also includes another substantially L-shaped member 62 which has the inwardly disposed face of the stem portion thereof rested against the rear side of the plate 57 and which has the downwardly disposed inner face of the foot portion thereof rested on the upper edge of the plate 57. The free end of the stem of the member 62 extends past the free end of the foot portion of the member 61 and the outwardly disposed face of this stem portion has spaced recesses 63 and 64, Fig. 9, that receive the heads of the bolts as 65 which freely pass through the stem portion of the member 62 but which are threaded into tapped openings in the foot portion of the member 61 (see Fig. 12). The stem portion of the member 61 extends across the free end of the foot portion of the member 62 and spaced recesses 66 and 67 are provided in the outwardly disposed face of that portion of the member 62 that is in alignment with the foot portion of the member 61, these recesses receiving the heads of bolts as 68 that are freely passed through the member 62 but which are threaded into tapped openings in the member 61 (see Fig. 13). It will be seen that the foregoing arrangement of the two L-shaped members so disposed and connected affords a reciprocatory mounting for the carriage 60 on the plate 57.

A bifurcated arm 69, Figs. 9 and 13, has the legs thereof passed over the outwardly disposed faces of the members 61 and 62 at the inner or right-hand end of the carriage 60 and a pin 70 is passed through the legs of this arm, the foot portion of the member 61 and the adjacent portion of the stem of the member 62 to thereby afford a pivotal support for the arm 69. A roller 71 is rotatable on a stud 72 fast in the free end of the arm 69. As best shown in Fig. 4, a surface cam 73 is fast to the drive shaft 45 at the left-hand end thereof, and this cam includes a rise 74 and a dwell 75. Spring anchors 76 and 77, Fig. 13, extend outwardly from the legs of the arm 69 and springs 78 and 79 respectively extend between these spring anchors and spring anchors as 80, Fig. 9, that are fast in the members 61 and 62, and these springs act to urge the roller 71 toward the rise 74 and the dwell 75 on the cam 73, movement of the arm 69 under the influence of the springs 77 and 78 being limited by engagement of said arm with a stop pin 69a fast in member 61.

A plate 81, Fig. 11, is rested against one face of the plate 57 near the outer free end thereof and a substantially L-shaped member 82 is so positioned that the inwardly disposed face of the stem thereof is rested against the face of the plate 57 opposite from that engaged by the plate 81, the foot portion of the substantially L-shaped member 82 extending beneath the underside of the plate 57 and engaging the plate 81. Recesses as 83 are provided in the outwardly disposed face of the plate 81 to receive the heads of bolts as 64 that are freely passed through the plates 81 and 57 but which are threaded into tapped openings in the member 82. This arrangement secures the plate 81 and the member 82 to the plate 57.

Figure 10:
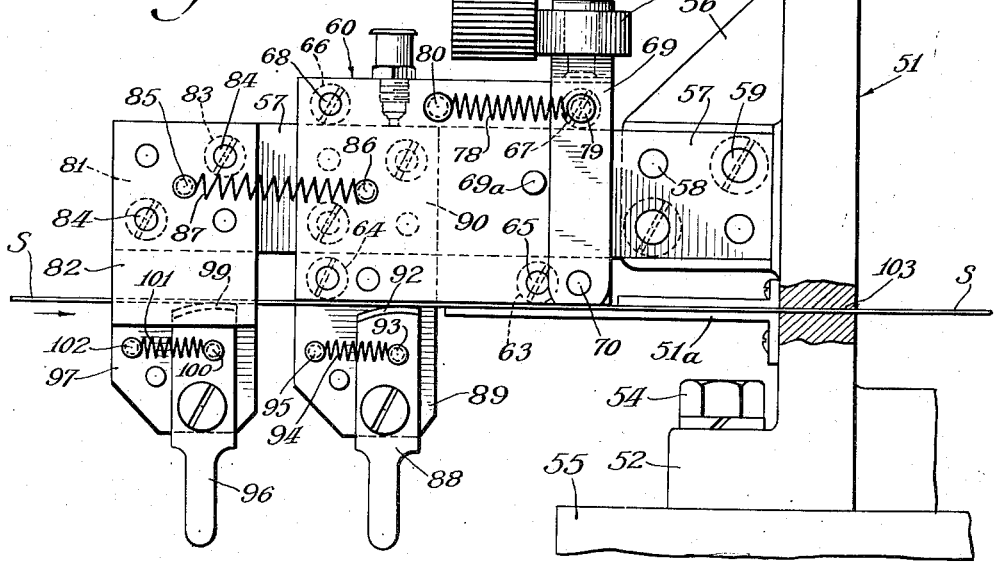
Fig. 10 is a view, similar to Fig. 9, showing the parts in a different operative position from that in which the parts are shown in Fig. 9.

Spring anchors as 85 extend outwardly from the member 82 and plate 81 and spring anchors as 86 are fast in and extend outwardly from the members 61 and 62. Springs as 87 respectively extend between spring anchors as 85 and 86 on each side of the plate 57 (see Fig. 5), and these springs are effective on the carriage 60 to urge it into the position shown in Fig. 9 so long as the roller 71 is in engagement with the dwell 75 of the cam 73. When, however, in the course of rotation of the cam 73 with the drive shaft 45, the rise 74, which includes tapered portions leading toward and away from the high place thereof, moves into such position that the approaching taper thereof starts to ride into engagement with the roller 71, the springs 78 and 79, which are stronger than the springs as 87, resisting pivoting of the arm 69 and therefore as the rise 74 moves over the roller 71, the effect of the springs 87 is overcome and the carriage 60 is moved along the plate 57 so that by the time the high place of the rise 74 is in engagement with the roller 71 the carriage 60 will have been moved from the position in which it is shown in Fig. 9 into the position in which it is shown in Fig. 10. Of course, as the high place of the rise 74 moves from association with the roller 71 and this roller moves down the tapered portion of the rise back to the dwell 75, the springs as 87 effect the return of the carriage 60 and by the time the roller 71 is riding on the dwell 75 the carriage 60 will be replaced into the position shown in Fig. 9.

Inasmuch as the rise 74 engages the roller 71 in each rotation of the drive shaft 75 it will be manifest that the carriage 60 is advanced from the position shown in Fig. 9 into the position shown in Fig. 10 and returned back to the position in which it is shown in Fig. 9 in each rotation of the drive shaft 45, and it is this reciprocation of the carriage 60 that is utilized to impart the step by step feeding or advancing movement to the strip S. Such feeding of the strip is effected by a feed dog 88 that is pivotally mounted on the pad 89 of the side plate 90, Figs. 12 and 13. This plate 90 is fast to the outwardly disposed face of the member 62 of the carriage 60 and the pad 89 depends below the foot portion of the member 61 of said carriage. The plate 90 is recessed as indicated at 91 to afford clearance below the lower end of the stem of the member 62 and the strip S is fed through this clearance, said strip also passing below the outwardly disposed face of the foot portion of the member 61. The feed dog 88 is provided with an arcuate upper surface 92 and has a spring anchor 93 thereon. A spring 94 extends between this spring anchor and a spring anchor 95 provided on the pad 89, and the effect of this spring is to urge the arcuate surface 92 into position to clamp the strip S against the foot portion of the member 61.

Another feed dog 96 is pivotally mounted on a pad 97 that depends from the plate 81. The plate 81 is recessed as indicated at 98, Fig. 11, and the strip S is passed through this recess to lie below the downwardly disposed face of the foot portion of the member 82. The feed dog 96 includes an arcuate upper surface 99 and has a spring anchor 100 thereon. A spring 101 extends between this spring anchor and a spring anchor 102 on the pad 97 and acts to hold the arcuate surface 99 in position to clamp the strip S against the exposed face of the foot portion of the member 82.

As will be explained more fully hereinafter, the strip S is fed entirely across the head L through the operative mechanisms therein and in the course of each operation of the machine a complete tab T is cut from the strip. The advancing movement that is imparted to the carriage is sufficient to advance the strip in each advancing movement thereof in an amount equal to the extent, in the line of movement of the strip, of the product such as the tab T. To insure that a step by step movement in this amount is imparted to the strip in each advancing movement thereof the carriage 60 is arranged to move slightly more than the distance required to advance the strip in the just described amount. However, in order to insure that the strip will only be fed in the desired amount, an adjustable stop screw 190, Figs. 1, 4 and 15A, is provided. A groove 189 is provided in the upper face of a clamp block 178, described more fully hereinafter, and the reduced stop end 190a of the stop screw 190 is arranged in this groove. The stop screw assembly includes a supporting nut 190b that is mounted in a tapped opening in the leg 50 of the frame 51, Figs. 4 and 15A, and the stop screw 190 is run through a tapped opening in this nut. A lock nut 190c is provided to retain the reduced stop end 190a of the stop screw 190 in its properly adjusted position.

In operation, when the carriage 60 starts to move from the position in which it is shown in Fig. 9 into the position in which it is shown in Fig. 10, it tends to cause the feed dog 88 to pivot relative to the strip S. The arcuate surface 92 on this feed dog is already in clamping relation with the strip S and the aforesaid action of the carriage 60 causes the feed dog to pivot with the action of the spring 94, and this causes the arcuate surface 92 to so clamp the strip S that relative movement between the strip and the carriage 60 is prevented. Therefore the strip S advances with the carriage during its movement from the position in which it is shown in Fig. 9 into the position in which it is shown in Fig. 10. Such advancing movement of the strip S with the carriage 60 continues until the leading free edge of the strip abuts the free end of the reduced portion 190a of the stop screw 190, but as soon as the strip abuts the stop screw further movement of the strip and carriage is arrested and thereafter the arm 69 pivots about the pin 70 against the action of the spring 78 until the roller 71 rests on the top of the rise 74 of the cam 73 as shown in Fig. 10. During advancing movement of the strip the feed dog 96 pivots against the action of the spring 101 to permit the strip S to slide thereby.

As the cam 73 continues its rotation and the roller 71 starts to move down from the rise 74 the spring 78 brings the arm 69 back into engagement with the stop 69a whereupon the spring 87 starts to return the carriage 60 to the position shown in Fig. 9 and at this time the spring 101 will be acting on the clamping dog 96 to hold the arcuate surface 99 thereof in clamping relation with the strip S, and in view of this the strip will be held in the position into which it has been advanced. However, in the course of movement of the carriage 60 from the position shown in Fig. 10 to the position shown in Fig. 9, the arcuate surface 92 rides over the strip S against the action of the spring 94, but when the position shown in Fig. 9 is reattained by the carriage 60 the spring 94 again causes the arcuate surface 92 to clamp the strip S to thereby prepare for the next advancing movement of the carriage 60 during which the strip S will again be advanced in the manner above described.

It will be seen that the foregoing arrangement insures that the strip S is advanced in a definite amount in each complete rotation of the drive shaft 45. Furthermore, by reason of the pivotal mounting of the dogs 88 and 96 and the arrangement of the arcuate surfaces thereon as well as the springs effective thereon, damage to the machine in event of jamming of the strip or the like is prevented.

In order to insure against buckling of the strip, especially after engagement of the leading edge thereof with the stop screw 190, the strip is rested on a support plate 51a that is secured to the outwardly disposed face of the leg 49 of the frame 51, as best shown in Figs. 9 and 10.

By referring to Figs. 1, 9, 10, 11 and 12 it will be seen that after the strip S has been withdrawn from the spool 25 and passed into the bight between the rollers 32 and 33 it is threaded through the recess 98, Fig. 11, then under the exposed surface of the foot portion of the member 61, then over the guide plate 51a and that thereafter the strip is passed through an opening 103 in the leg 49 of the frame 51 to then be passed through the devices carried by the frame 51 which perform the forming operations on the strip S to thereby produce tabs as T. It will be understood that it is the carriage 60 which advances the strip S through the bight between the rollers 32 and 33 and also through the operative devices in the frame 51 so that only one feeding means is required for the strip.

In the present instance where tabs T are being produced, the operative devices carried by the frame 51 consist of perforating, slitting, notching and cropping mechanisms, and these mechanisms are arranged in side by side relation so as to be successively operative on the strip S during at rest intervals in the step by step movement imparted thereto.

As shown in Fig. 23, the tab T includes a tongue D that is formed in the stem C thereof, this stem being narrower than the body E of the tab so that positioning shoulders P are defined at the juncture of the body E with the stem C. When the stem C is inserted into the retaining devices therefor on a printing device or the like in its proper position as determined by the shoulders P (as is explained in detail in the above referred to Patent No. 2,049,439), the tongue D is sprung from the plane of the stem C to cooperate with means which prevent accidental displacement of the tab T from the printing and control device.

Production of means such as the tongue D in a relatively thin member such as the tab T can best be effected by performing the forming operations in such order that the maximum support for the material is afforded during each forming operation and in view of this the formation of the tongue D is effected in the present instance by first producing the perforation as W, Fig. 22, which defines the top end of the tongue D. The sides of the tongue are next defined by next successively forming the slits as X and Y. Thereafter the notch Z is formed in the strip S to define, as the parts are viewed in Figs. 22 and 23, the left-hand shoulder P on one tab and the right-hand shoulder P on the succeeding tab. Thereafter the body E of one tab is separated from what is to be the body E of the succeeding tab by a cropping operation effected along the broken line R, Fig. 22, and as a part of this cropping operation the upper corners of the body E are trimmed or rounded, as indicated at F, Fig. 23, so that at the end of the cropping operation a tab such as that illustrated in Fig. 23 is discharged from the machine.

In order to perform the above described operations in the described sequence a perforating punch and die, generally indicated by 104, Figs. 4, 6, 15, 16 and 17, is provided in the frame 51 in position to be operative on the strip S immediately after this strip is passed beyond the opening 103. A slitting punch and die assembly, generally indicated by 105, Figs. 4, 6, 15, 16 and 18, is provided in the frame 51 adjacent the perforating punch and die assembly 104 and a notching punch and die assembly, generally indicated by 106, Figs. 4, 6, 15, 16 and 19, is provided in the frame 51 adjacent the slitting punch and die assembly 105. Then a cropping punch and die assembly, generally indicated by 107, Figs. 4, 6, 15, 16 and 20, is provided adjacent the notching punch and die assembly 106, and the arrangement is such that the perforating punch and die assembly 104 is mounted in the frame 51 adjacent the leg 49 thereof while the cropping punch and die assembly is mounted in the frame 51 adjacent the leg 50 thereof.

As stated heretofore, the frame 51 is fast to the bed 55 and extending inwardly from each of the legs 49 and 50 of the frame 51 and rested on the upper surface of the bed 55 are pads 108 and 109, Fig. 5. A guide block 110, illustrated in plan detail in Fig. 8, has the lower portion of the rear face thereof abutted against the pads 108 and 109 and, as illustrated in Fig. 17, bolts as 111 pass through the pads and secure the guide block in position between the legs 49 and 50 of the frame 51, other bolts 111a, Fig. 4, serving to secure the guide block to the bed 55. The guide block 110 has four vertical guideways 112, 113, 114 and 115 therein adapted to respectively receive the punch and die assemblies 104 to 107, respectively.

The punch and die assembly 104 is illustrated best in Figs. 15 to 17 and by referring thereto it will be seen that the punch and die assembly includes a punch holder 116. This punch holder 116 has a portion shaped complementary to the guideway 112, the configuration of which is best shown in Fig. 8, and this arrangement is such that the punch holder will be accurately guided in the vertical movement imparted thereto in a manner described hereinafter. An opening 117 extends into the punch holder 116 from the lower end thereof and a punch 118 is adapted to be inserted into this opening. The punch 118 is shaped to produce the perforation W, and the cutting portion is therefore semi-circular in cross-section. It is important that the punch 118 be held against movement in the opening 117 and this may be conveniently accomplished by forming a keyway 119, Fig. 17, in the upper end of the punch in such position that when the punch is inserted into the opening 117 this keyway may be aligned with an opening 120 in the punch holder 116. The keyway 119 is accurately located with respect to the semi-circular configuration of the punch 118 and the opening 120 is accurately located in the punch holder 116. Thus after the keyway 119 and the opening 120 are aligned, the punch may be secured in position as by soldering and thereafter the punch 118 will be accurately held in position.

The die 122 preferably consists of two die blocks 123 and 124 that are accurately retained in a die holder 125 which also has a portion thereof shaped complementary to the guideway 112. An enlarged opening 126 passes through the guide block 110 from the rear face thereof and opens into that portion of the guideway 112 whereat the die holder 125 is to be positioned, this opening being countersunk, as indicated at 127, to receive the head of a bolt 128 that is freely passed through the enlarged opening 126 and which is threaded into a tapped opening 129 in the die holder 125.

A block 130 is fast in the guide block 110 and projects from the front face thereof in spaced relation with the bed 55, and a tapped opening 131 is provided in the block 130 in alignment with the guideway 112. An adjusting nut 132 is mounted in the tapped opening 131 and the lower end of the die holder 125 rests on this adjusting nut when in operative position. The clearance afforded about the bolt 128 by the enlarged opening 126 enables vertical adjustment of the die holder by manipulation of the adjusting nut 132 to insure that the operative faces of the die blocks 123 and 124 will lie in proper position to support the strip S during the time the punch 118 is operative thereon. A set screw 132' cooperates with the adjusting nut 132 to prevent undesired movement thereof once the aforesaid positioning of the die blocks 123 and 124 has been effected. An opening 131' leads through the adjusting nut 132 and the die holder 125 and communicates with the die opening 121 in the die blocks 123 and 124 so that trimmings may fall therethrough to be discharged from the machine.

In order to further insure accurate cooperation of the punch 118 with the die opening 121, a guide block 133 is provided which has a portion that is complementary to the guideway 112. The guide block is retained in position by a bolt 134 that is freely passed through the guide block 110 and threaded into a tapped opening in the guide block. The lower portion of the punch holder 116 is preferably circular in cross-section and is smaller than the upper portion thereof, and this circular portion 135 is passed through the guide opening provided in the guide block 133.

In order to insure seating of the portion of the punch holder 116 that is shaped complementary to guideway 112 in such guideway in the vertical reciprocation of this punch holder, an opening 136 is provided in the guide block 110, this opening extending inwardly from the rear face of the guide block but being terminated in spaced relation with the front face thereof. A smaller opening 137 leads from the inner end of the opening 136 to the guideway 112. A plunger 138 is passed through the openings 136 and 137 and has the inner reduced threaded end thereof secured in a tapped opening 139 in the punch holder 116. A block 140 is mounted in the opening 136 to bear against the inner end thereof and has a spring chamber 141 therein in which a spring 142 is mounted to extend between the inner end of the spring chamber 141 and a shoulder 143 on the plunger 138. The opening 137 is of sufficient size to enable the plunger 138 to freely move therein in the course of vertical reciprocation of the punch holder 116 and the opening 136 is sized to enable movement of the block 140 therein in the course of such reciprocal movement. It will be manifest that the tension of the spring 142 is impressed on the plunger 138 and that in this way the punch holder 116 is effectively seated in the guideway 112 for reciprocation therein.

The slitting punch and die assembly 105 is best illustrated in Figs. 15, 16 and 18 and by referring thereto it will be seen that this punch and die assembly includes a quill 144 that is adapted to encase and frictionally engage a tubular punch holder 145. An enlarged recess 146 is provided in the lower end of the quill 144 and a guide block assembly 147, corresponding to the die block assembly hereinafter described, is fast in the recess 146. Guide openings are provided in the guide block assembly 147 and the slitting punches 148 and 149 are reciprocal through these guide openings to respectively cooperate with the slitting die openings 150 and 151 in the die block assembly 152. This die block assembly, like the die block assembly 122, consists of a plurality of accurately machined die blocks which, when fitted together and fast in the die holder 153, cause the die openings 150 and 151 to be accurately located with respect to the punches 148 and 149. The die holder 153 is adapted to rest on an adjusting nut 154 that is mounted in a tapped opening 155 provided in the block 130 in alignment with the guideway 113, a set screw 156 being provided to retain the adjusting nut 154 in the positions into which it is moved to dispose the outward face of the die block assembly 152 in position to support the strip S at the time the punches 148 and 149 are operative thereon. An opening 151' leads through the adjusting nut 154 and the die holder 153 and communicates with the die openings 150 and 151 so that trimmings may fall therethrough to be discharged from the machine.

The punches 148 and 149 are retained in the punch holder 145 by a die casting 157 that is formed in situ and to this end an opening 158 is provided in the guide block assembly 147 at a medial position therein. When the punches 148 and 149 are to be fast in the punch holder 145, the lower end of this punch holder is arranged in spaced relation with the guide block assembly 147 in the quill 144 and the punches 148 and 149 are passed through the guide openings in the guide block assembly. The adjusting screw 200 is also arranged to have the inner end thereof spaced inwardly a short distance from the lower end of the punch holder. Then, in a manner well understood in the art, a die casting operation is carried out to form the die casting 157 in situ which thereafter firmly retains the punches 148 and 149 in the punch holder 145. It has been explained heretofore that the punch holder 145 is tubular and the interior thereof is screw-threaded so that in the course of the aforesaid die casting operation a screw-threaded boss 159 is formed. Hence when it is desired to sharpen or to replace the punches 148 and 149, these punches are retracted from the guide openings in the guide block assembly 147 and thereafter the screw-threaded boss 159 may be unscrewed from the interior of the punch holder 145. Inasmuch as the screw threads on the boss 159 are formed in situ, it is manifest that the die casting 157 will seat accurately in the punch holder 145 even after repeated removals and installations thereof in this punch holder and this insures accurate positioning of the punches 148 and 149.

A portion of the quill 144 is shaped complementary to the guideway 113 and a spring-pressed plunger assembly generally indicated by 160, corresponding to that including the plunger 138, cooperates with the quill to insure seating thereof in the guideway 113 in the course of vertical reciprocation thereof in this guideway.

An opening 161, Fig. 18, is provided in the guide block 110 and a headed pin 162 is mounted in this opening to have the head thereof engaged with the rear face of the guide block 110. An eccentric boss 163 is provided on the inner end of the pin 162 to lie in the path of vertical movement of the quill 144. A clamp screw 164 cooperates with the head of the pin 162 to retain the eccentric boss 163 on this pin in adjusted positions. In the course of vertical reciprocation of the punch portion of the punch and die assembly 105, the upper end of the quill 144 engages the eccentric boss 163 and this arrests upper movement of the quill, the punch holder 145 being frictionally engaged with the quill and moving relative thereto once the movement of the quill is so arrested. When the punch portion of the punch and die assembly 105 moves downwardly, the outwardly disposed face of the guide block assembly 147 comes into engagement with the strip S to thereby clamp the strip between this guide block assembly and the die block assembly 152. The guide openings in the guide block assembly are at this time aligned with the die openings 150 and 151 and the lower ends of the punches 148 and 149 are in the upper portions of the guide openings in the guide block assembly. Because of the frictional engagement between the quill 144 and the punch holder 145, the quill starts to move downwardly as soon as the punch holder starts to move downwardly, but when movement of the quill is arrested by engagement of the guide block assembly 147 with the strip S, the punch holder 145 moves relative to the quill and thereupon the punches 148 and 149 move through the openings in the guide block assembly and the strip material into the guide openings 150 and 151 to thereby form the slits X and Y in the strip material. When, however, the punch holder 145 starts to move upwardly, the quill 144 immediately starts to move upwardly therewith, and this movement continues until the quill engages the eccentric boss 163 which, as stated heretofore, arrests upward movement of the quill and thereupon the punches 148 and 149 are retracted back into the guide openings in the guide block assembly 147, the adjustment afforded by the eccentric boss 163 being such that the extent of relative movement between the punch holder 145 and quill 144 upon such arresting of the movement of the quill 144 prevents the punches 148 and 149 from being withdrawn from the guide openings in the guide block assembly.

Figure 21:
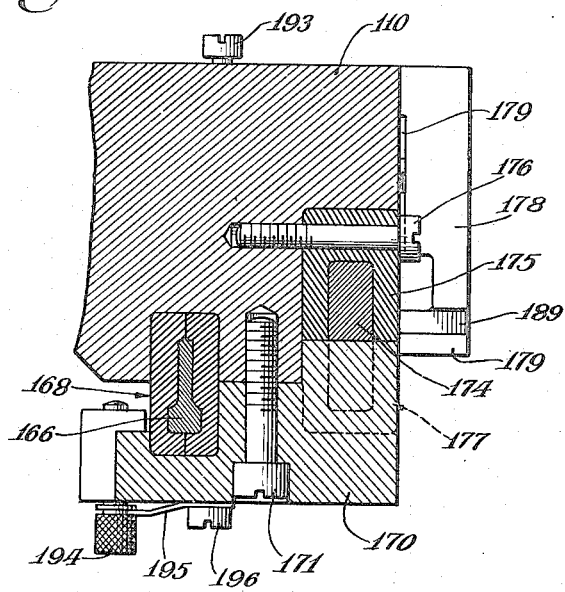

The notching punch and die assembly 106 is best illustrated in Figs. 15, 16, 19 and 21 and comprises a punch holder 165 that is reciprocal in the guideway 114 in the guide block 110. The punch 166 has a reduced upper end portion that is extended into a complementary opening in the punch holder 165 and which is secured therein by a screw 167. A stationary punch guide assembly 168 consisting of two halves, as shown in Fig. 21, serves to guide the punch in the reciprocatory vertical movement. A die assembly 169 is disposed beneath the punch guide assembly 168. Both of the just mentioned assemblies are held in position by a block 170 which is secured to the front face of guide block 110 by screws 171, Figs. 16 and 21. As shown in Fig. 19, the punch 166 has a lip portion 172 at the lower end thereof which is in constant engagement with a face of the die assembly 169 but which, as shown in Fig. 16, clears the strip S, and hence this lip portion may remain in engagement with the die assembly 169 to afford a guide for the punch 166. The punch 166 in the punch and die assembly 106 operates to produce the notch Z in strip S, Fig. 22.

The cropping operation is performed by the punch and die assembly 107, which is best shown in Figs. 15, 16, 20 and 21. This assembly comprises a punch holder 173 to which there is secured a cropping punch 174, which punch is reciprocal in a U-shaped block 175 secured to guide block 110 by a bolt 176, Fig. 21. The outwardly disposed faces of the legs on the U-shaped block 175 abut a vertical surface of the block 170. A die assembly 177 consisting of two halves, as shown in Fig. 16, is disposed below the cropping punch 174. This die assembly 177 is held in place laterally by a clamp block 178. This clamp block 178 has a recess 179 therein in such a manner that a screw 180 may be employed to urge the abutment 179 of clamp block 178 into tensioned engagement with the die assembly 177. A pin 181 retains the clamp block 178 in position when for any reason the tension of the block has been removed by the unscrewing of bolt 180. Two set screws 182 bear against the front vertical face of the die assembly 177 to positively prevent longitudinal displacement thereof. The set screws 182 are threaded through tapped holes in the block 170.

A punch 174 is utilized to perform two simultaneous cropping or trimming operations. Referring to Fig. 22, it will be noted that when a tab T is formed by a severing operation along the line R a sharp corner at the position indicated by R' will be left jutting forth from the body E of the succeeding tab T. Thus, the punch 174 not only severs the tab along the line R but also trims off the sharp corner which has been left as a result of the previous severing operation. Referring to Figs. 15 and 16, the left-hand edge of the punch 174 which overlies the edge 174' of the die assembly 177 performs the severing operation along the line R, whereas the rounded corner of the punch 174 which overlies the rounded corner 175' of the die assembly 177 performs the operation of trimming the corner R'.

Both of the die assemblies 169 and 177 are seated on the shelf 130 which, as has been mentioned hereinabove, is secured to the guide block 110. A support block 183 is disposed between shelf 130 and the upper surface of the machine bed 55, this support block being secured to shelf 130 by bolts 184 and 185. A guide bar 186, Fig. 15, is fastened to the bed 55 by a screw 187, this guide bar 186 being seated in a recess provided for that purpose in the bed 55. A recess 188 in the support block 183 is provided so that the support block 183 as well as the entire assembly associated with guide block 110 may be accurately positioned with respect to the guide bar 186 when the parts are assembled in the machine.

As mentioned hereinabove, a groove 189 is provided in the upper face of the clamp block 178 to permit the passage of an adjustable stop screw 190, Figs. 4, 6 and 15A. The screw 190 may be adjustably positioned so that the end thereof will serve to engage the end of the strip S while the latter is being fed through the machine and stop it against further movement.

A side register for guiding the strip S through the punch and die assemblies is provided in the form of a narrow block 191, Figs. 16 to 19, inclusive, this block or strip 191 being mounted in a recess 192 in guide block 110. Adjusting screws 193 are provided to enable orientation of the strip 191.

In order that the front edge of the strip S will be accurately guided, plunger 194, Fig. 16, is mounted in the block 170, the end of this plunger 194 being urged against the front edge of the strip S by the tension of spring 195 which is anchored to block 170 by a cap screw 196.

The punch and die assemblies 104 to 107, inclusive, and more particularly the punches and cooperating die openings thereof, are accurately spaced from each other in the line of advance of the strip S so that the formation of the tabs T is effected progressively as the strip advances past these punch and die assemblies. The spacings of the various cooperating punches and die openings one from the other are either equal to or multiples of the length of the advancing movement imparted to the strip S in each reciprocation of the carriage 60, and in order to better explain the aforesaid spacing of the punches and cooperating die openings reference is directed to Fig. 22 wherein the manner in which the operations are progressively effected on the strip S is illustrated.

When a new strip S is fed through the opening 103 and between the cooperating punches and die openings of the various punch and die assemblies, the leading edge thereof is engaged with the stop screw 190 and in this way the strip is accurately oriented in operative relation with the punch assemblies. The first few operations will result in the production of incomplete tabs T and for the purpose of this description such incomplete tabs will be disregarded and the manner in which the operations are successively performed to produce the first complete tab T will be described.

The first operation leading to the production of a complete tab T will be production of the opening W at the point $a$, Fig. 22, it being understood that at this time this portion of the strip is disposed between the punch 118 and the die opening 121. Immediately upon completion of the formation of the opening W at the point $a$, the carriage 60 functions to advance the strip S and after the strip comes to rest the punch and die assemblies will again be rendered operative and in this operation of these punch and die assemblies the only effective operation on the strip S, in so far as the first and subsequent complete tabs T are concerned, is the formation of the opening W at the point $b$, the reason for this being that the spacing between the punch 118 and the punch 148 is greater than the amount of advancing movement imparted to the strip S. After the production of the opening W at the point $b$, the strip S is again advanced by the carriage 60 and at this time the opening W at the point $a$ moves into association with the punch 148. It will therefore be apparent that the spacing between the punches 118 and 148 is equal to two advancing movements of the strip S, it of course being understood that the aforesaid spacing is also such that the punch 148 is located with respect to the opening W at the point $a$ in such position as to form the slit X in such location that the upper end thereof opens into the left-hand marginal end of the opening W at the point $a$.

In the next operation of the punch and die assemblies, an opening W is produced at the point $c$ and since the opening W at the point $a$ is now associated with the punch 148, this punch is effective in this operation of the punch and die assemblies to produce the slit X at the point $c^1$.

In the next advancing movement of the strip S, the opening W at the point $a$ moves into cooperating relation with the punch 149 and it will therefore be seen that the spacing between the punches 148 and 149 is equal to the amount moved in one advancing movement of the strip S, the punch 149 also being located with respect to the punch 148 so as to cooperate with the opening W at the point $a$ in such a way that the slit Y produced by this punch opens into the right-hand marginal portion of such opening W. In the next operation of the punch and die assemblies the perforating punch 118 produces an opening W at the point $d$, the punch 148 produces a slit X at the point $d^1$ and the punch 149 produces a slit Y at the point $d^2$. At this time it will be noted that the tongue D is completely formed in the first complete tab.

In the next operation of the punch and die assemblies an opening W is produced at the point $e$, a slit X is produced at the point $e^1$, and a slit Y is produced at the point $e^2$, and in the succeeding operation of the punch and die assemblies an opening W is produced at the point $f$, a slit X is produced at the point $f^1$, and a slit Y is produced at the point $f^2$.

It will, of course, be understood that the strip S advances intermediate each operation of the punch and die assemblies and in the operation of the punch and die assemblies subsequent to that just referred to an opening W is produced at the point $g$, a slit X is produced at the point $g^1$, and a slit Y is produced at the point $g^2$. Furthermore, in this cycle of operation the leading edge of what will be the first complete tab T is in position to cooperate with the notching punch and die assembly 106. Hence in this cycle of operation the notch Z is formed at the point $g^3$ to effect formation of the right-hand side of the stem portion C of the first tab T. From this it will be seen that the spacing between the punch 149 and the punch 166 is equal to the amount of three advancing movements of the strip S plus, of course, the positioning of the punch 166 in operative position with respect to the strip S so as to form the notch Z at the proper position.

In the next operation of the punch and die assemblies an opening W is formed at the point $h$, a slit X at the point $h^1$, a slit Y at the point $h^2$, and a notch Z at the point $h^3$, this operation completing formation of the left-hand side of the stem portion C of the first complete tab T. In the succeeding operation of the punch and die assembly an opening W is formed at the point $i$, a slit X at the point $i^1$, a slit Y at the point $i^2$, and a notch Z at the point $i^3$.

In the next operation of the punch and die assemblies the right-hand side of what is to be the first complete tab T will be moved into association with the left-hand edge of the cropping punch 174 and it will therefore be seen that this left-hand edge of this punch is spaced from the notching punch 166 in an amount equal to two advancing movements of the strip S, taking into consideration, of course, the orientation of the cropping punch 174 with respect to the point of operation thereof on the strip S to form a tab T. Thus in the next cycle of operation of the punch and die assemblies an opening W is formed at the point $j$, a slit X is formed at the point $j^1$, a slit Y is formed at the point $j^2$, a notch Z is formed at the point $j^3$, and the left-hand side of the cropping punch 174 operates on the strip S at the point $j^4$ to form the right-hand side of the body portion E of the first complete tab T.

The right-hand side of the trimming punch 174 is spaced from the left-hand side thereof in an amount equal to one advancing movement of the strip S, which is an amount equal to the width of the body portion E of the tab T, and from this it will be seen that the amount of advancing movement imparted to the strip S in each reciprocation of the carriage 60 is equal to the width of the product to be produced, in this instance the tab T.

In the next and all succeeding cycles of operations of the punch and die assemblies, until exhaustion of the strip S, an opening W is formed as at the point $k$, a slit X is formed as at the point $k^1$, a slit Y as at the point $k^2$, a notch Z as at the point $k^3$, and cropping operations are performed as at the points $k^4$ and $k^5$ by the cropping punch 174. In each such operation a first complete tab T is severed from the strip S by the operation that is performed as at the point $k^4$.

As the completed tabs T are severed from the strip S in the manner just described these tabs pass through the opening 197, Figs. 15 and 20, that extends through the opening in the die assembly 177, shelf 130, support block 133 and bed 55. The tab T also falls through the opening 198 in the table top A that extends beneath the entire punch and die assembly to permit trimmings struck from the strip S by operation of the various punch and die assemblies to pass into suitable collecting pans or the like on the shelf 34, it being understood that a suitable collecting pan or the like is provided to receive the completed tabs T as they fall through the openings 197 and 198.

It will be manifest from the foregoing description that it is essential that all of the punches of the punch and die assemblies 104 to 107 move simultaneously, and to this end means are provided for imparting such movement to the punches. Headed adjusting screws 199, 200, 201 and 202 are respectively threaded into tapped openings provided in the upper ends of the punch holders 116, 145, 165 and 173 and T-shaped slots 203, 204, 205 and 206 are provided in a block 207 to receive the heads of the adjusting screws 199 to 202, respectively. Each of the adjusting screws has openings as 208 in the head thereof into which a suitable tool may be inserted after the heads of the screws are mounted in the slots as aforesaid to enable adjustment of the screws which, of course, effects adjustment and vertical positioning of the punches carried by the punch holders.

A vertical reciprocatory movement is imparted to the block 207 from the drive shaft 45 in the manner best illustrated in Fig. 5A where it will be seen that the block 207 is suitably secured to a slide plate 209. A slide block 210 is positioned above the slide plate 209 and has an opening 211 therein in which the eccentric portion 212 on the drive shaft is mounted. Another slide plate 213 is positioned above the slide block 210 and the slide plates are interconnected to retain the slide block therebetween by studs as 214 that have the ends thereof fast in the slide blocks. A stud 216 is fast in the plate 213 and extends through a bushing 215, Fig. 6, mounted in the bight of the frame 51, this arrangement, in cooperation with guide pins 215', extended through the bight of the frame 51, serving to guide the slide plate and block assembly, just described, in the vertical movement imparted thereto upon rotation of the shaft 45. In the course of rotation of the shaft 45, the eccentric portion 212 on the shaft 45 rotates in the opening 211 and causes the slide block 210 to reciprocate between the slide plates 209 and 213, and in the course of such rotation and sliding the eccentric portion causes the slide block and plate assembly and the block 207 to reciprocate vertically which, of course, correspondingly reciprocates the punches in the punch and die assemblies 104 to 107, inclusive.

It will be noted that an oil cup 220, Figs. 4, 6 and 7, is associated with the stud 216 and that at other suitable positions throughout the machine means are provided for lubricating the various operative parts and particularly those included within the heads L and R but, inasmuch as any suitable means for lubricating the machine may be utilized, the particular lubricating means herein employed is not described in detail, the lubricating means illustrated being typical of means that can be employed for the purpose and also being illustrative of the fact that it is desirable to employ suitable lubricating means.

As has been stated heretofore, the operative devices included within the head R correspond to those provided in the head L and, in view of such similarity, parts in the head R which correspond to parts in the head L, that have been described hereinabove, have the same reference character applied thereto, but where such reference characters designate parts in the head R the suffix "r" is added thereto.

Inasmuch as it is desirable to feed the strip material into the heads L and R from the outwardly disposed sides thereof, the pad 56r which supports the plate 57r is mounted on the leg 50r of the frame 51r rather than on the leg 49r as was done in the frame 51. Furthermore, the punch and die assemblies 104r, 105r, 106r and 107r are arranged, as viewed in Fig. 4, in the aforesaid order to extend from right to left in contradistinction to the arrangement of the punch and die assemblies 104 to 106 which are arranged in that order, as viewed in Fig. 4, from left to right in the head L. Other than this, the head R, as stated hereinabove, corresponds to the head L.

The provision of two heads as L and R enables two products such as the tab T to be produced in each revolution of the common drive shaft 45, and it will be understood that independent drive shafts could be used in place of the common drive shaft 45 in event it was desired so to do. Furthermore, either of the heads may be operated independently of the other, which is to say, it is not essential that strip material be fed into both of the heads in order to enable the machine to be operated. Thus, if it is desired to remove the punches and dies in one of the heads for sharpening, the machine may be kept in operation and products will be produced in the other of the heads.

It will be apparent from the foregoing description that I have provided a machine tool in which relatively small parts are employed and which may therefore be operated rapidly. Furthermore, the arrangement of parts is such that the movable elements and especially those which are to directly act on the work are effectively guided so that a high degree of accuracy may be attained.

It is of course to be understood that while I have shown and described a machine particularly adapted for the production of small difficult products, such as the tabs T, the machine is capable of producing a wide variety of different products in which event it would only be necessary to change the particular arrangement of the various punches and dies illustrated in the drawings and described hereinabove.

It will also be understood that the construction employed in the punch and die assembly 105 centering in the use of a quill and, more particularly, in the use of a punch holder in which a retaining means for the punches can be formed in situ, as by die casting, is particularly advantageous, and resort could be had to such retention of the punches in all of the punch and die assemblies if so desired, and this applies with equal force to the manner in which various other of the punches and dies are arranged in the present machine.

Thus while I have illustrated and described a selected embodiment of my invention it is to be understood that it is capable of variation and modification and I therefore do not wish to be limited to the precise details set forth but desire to avail myself of such changes and alterations as fall within the purview of the following claims.

I claim:

1. In a machine tool for making small but difficult products from relatively thin stock, a frame, a guide block mounted in said frame and having a guideway formed therein in which both a punch and die assembly may be mounted to insure accurate alignment thereof, said block having a stock receiving slot formed therein and extended across said guideway, a die assembly fast in said guideway on one side of said slot and having at least one die opening therein, a punch assembly mounted in said guideway on the other side of said slot and having at least one punch therein adapted to seat in said die opening, and means for imparting a reciprocatory movement at least to the part of said punch assembly carrying said punch and operable to advance said punch across said slot and into said die opening and to retract said punch from said die opening back across said slot whereby said punch operates on stock disposed in said slot between said die opening and said punch.

2. In a machine tool for making small but difficult products from relatively thin stock, a frame, a guide block mounted in said frame and having a guideway formed therein in which both a punch and die assembly may be mounted to insure accurate alignment thereof, said block having a stock receiving slot formed therein and extended across said guideway, a die assembly fast in said guideway on one side of said slot and having at least one die opening therein, a punch assembly mounted in said guideway on the other side of said slot and having at least one punch therein adapted to seat in said die opening, means for imparting a reciprocatory movement at least to the part of said punch assembly carrying said punch and operable to advance said punch across said slot and into said die opening and to retract said punch from said die opening back across said slot whereby said punch operates on stock disposed in said slot between said die opening and said punch, means for imparting a step by step movement to said stock, and means for timing the operation of the means for imparting the reciprocatory movement and the means for advancing the stock to insure advance of said stock intermediate passage of said punch into said die opening.

3. In a machine tool for making small but difficult products from relatively thin stock, a frame, a guide block mounted in said frame and having a guideway formed in one face thereof in which both a punch and die assembly may be mounted to insure accurate alignment thereof, said block having a stock receiving slot formed therein and extended across said guideway, a die assembly fast in said guideway on one side of said slot and having at least one die opening therein, a punch assembly mounted in said guideway on the other side of said slot and having at least one punch therein adapted to seat in said die opening, and means for imparting a reciprocatory movement at least to the part of said punch assembly carrying said punch and operable to advance said punch across said slot and into said die opening and to retract said punch from said die opening back across said slot whereby said punch operates on stock disposed in said slot between said die opening and said punch.

4. In a machine tool for making small but difficult products from relatively thin stock, a frame, a guide block mounted in said frame and having a guideway formed therein in which both a punch and die assembly may be mounted to insure accurate alignment thereof, said block having a stock receiving slot formed therein and extended across said guideway, a die assembly fast in said guideway on one side of said slot and having at least one die opening therein, a punch assembly mounted in said guideway on the other side of said slot and having at least one punch therein adapted to seat in said die opening, means for imparting a reciprocatory movement at least to the part of said punch assembly carrying said punch and operable to advance said punch across said slot and into said die opening and to retract said punch from said die opening back across said slot whereby said punch operates on stock disposed in said slot between said die opening and said punch, means for imparting a step by step movement to said stock, and means for timing the operation of the means for imparting the reciprocatory movement and the means for advancing the stock to insure advance of said stock intermediate passage of said punch into said die opening.

5. In a machine tool for making small but difficult products from relatively thin stock, a frame, a guide block mounted in said frame and having a guideway formed in one face thereof, said block having a stock receiving slot formed therein and extended across said guideway, a die assembly fast in said guideway on one side of said slot, a punch holder reciprocally mounted in said slot, said block having an opening therein leading to said guideway, means mounted in said opening and connected with said punch holder and operative to positively seat said punch holder in said guideway, said die assembly having at least one die opening therein, said punch holder having at least one punch thereon and said punch holder normally being arranged to dispose said at least one punch on the side of said slot in said block opposite the side of said slot on which said die assembly is mounted, and means for imparting a reciprocatory movement to said punch holder and operable to advance said at least one punch across said slot and into said at least one die opening and to retract said at least one punch from said at least one die opening back across said slot whereby said punch operates on stock disposed in said slot between said die opening and the normal position of said punch.

6. In a machine tool for making small but difficult products from relatively thin stock, a frame, a guide block mounted in said frame and having a guideway formed in one face thereof, said block having a stock receiving slot formed therein and extended across said guideway, a punch holder, a holding sleeve frictionally engaging said holder and reciprocally mounted in said guideway, means for positively seating said holding sleeve in said guideway, said die assembly having at least one die opening therein, said punch holder having at least one punch thereon accurately aligned with said at least one die opening by reason of the mounting of said die assembly and said holding sleeve in said guideway, said punch holder and said holding sleeve being normally positioned to dispose said punch on the side of said stock receiving slot opposite that on which said die assembly is mounted, and means for imparting a reciprocatory movement to said holding sleeve and said punch holder whereby said holding sleeve engages said stock at or prior to the engagement thereof by said punch in the movement of said punch toward said stock, said means for imparting reciprocatory movement being operable to advance said punch across said slot and into said die opening and to retract said punch from said die opening back across said slot whereby said punch operates on stock disposed in said slot between said die opening and said punch, the engagement of said holding sleeve with said stock insuring accurate cooperation of the punch with said stock.

7. In a machine tool for making small but difficult products from relatively thin stock, a frame, a guide block mounted in said frame and having a guideway formed in one face thereof, said block having a stock receiving slot formed therein and extended across said guideway, a punch holder, a holding sleeve frictionally engaging said holder and reciprocally mounted in said guideway, means for positively seating said holding sleeve in said guideway, said die assembly having at least one die opening therein, said punch holder having at least one punch thereon accurately aligned with said at least one die opening by reason of the mounting of said die assembly and said holding sleeve in said guideway, said punch holder and said holding sleeve being normally positioned to dispose said punch on the side of said stock receiving slot opposite that on which said die assembly is mounted, means for imparting a reciprocatory movement to said holding sleeve and said punch holder whereby said holding sleeve engages said stock at or prior to the engagement thereof by said punch in the movement of said punch toward said stock, said means for imparting reciprocatory movement being operable to advance said punch across said slot and into said die opening and to retract said punch from said die opening back across said slot whereby said punch operates on stock disposed in said slot between said die opening and said punch, the engagement of said holding sleeve with said stock insuring accurate cooperation of the punch with said stock, the frictional engagement between said punch holder and said holding sleeve being sufficient to insure disengagement of said holding sleeve from said stock upon retraction of said punch in the course of operation of the means for imparting reciprocatory movement to the punch holder, and means for limiting the disengaging movement of said holding sleeve to less than the retracting movement of said punch holder.

8. In a machine tool for making small but difficult products from relatively thin stock, a frame, a guide block mounted in said frame and having a guideway formed in one face thereof, said block having a stock receiving slot formed therein and extended across said guideway, a die assembly having at least one die opening therein, a punch assembly including at least one punch, said die assembly and said punch being disposed in said guideway with said die assembly on one side of said slot and with the punch assembly arranged to have said at least one punch thereof disposed on the other side of said slot, means for accurately seating said punch and die assemblies in said guideway to thereby insure alignment of the punch with said die opening, and means for imparting a reciprocatory movement to at least the part of said punch assembly carrying said punch and operable to advance said punch across said slot and into said die opening and to retract said punch from said die opening back across said slot whereby said punch operates on stock disposed in said die slot between said die opening and said punch.

9. In a machine tool for making small but difficult products from relatively thin stock, a frame, a guide block mounted in said frame and having a plurality of parallel guideways formed therein, said block having a stock receiving slot formed therein and extended across said guideway, fashioning means comprising a plurality of independent means for effecting fashioning operations on stock passed into said slot, the independent means including cooperative elements and being respectively mounted in said guideways to thereby insure accurate alignment between the cooperative parts of said cooperative elements, one element of each of said independent means being disposed in a guideway on one side of said slot and the other of the elements being disposed in such guideway on the other side of said slot, means for bringing the cooperative parts of said independent means into cooperative relation to effect fashioning operations on stock disposed in said slot, and means for advancing said stock intermediate cooperation of said cooperative parts to thereby advance a given portion of said stock from association with one of said independent means into association with another of said independent means in the advancing movement thereof.

10. In a machine tool for making small but difficult products from relatively thin stock, a frame, a guide block mounted in said frame and having a plurality of parallel guideways formed therein, said block having a stock receiving slot formed therein and extended across said guideway, fashioning means comprising a plurality of independent means for effecting fashioning operations on stock passed into said slot, the independent means including cooperative elements and being respectively mounted in said guideways to thereby insure accurate alignment between the cooperative parts of said cooperative elements, one element of each of said independent means being disposed in a guideway on one side of said slot and the other of the elements being disposed in such guideway on the other side of said slot, said guideways and said independent means being constructed and arranged to dispose the cooperative parts of said independent means from one another along said stock receiving slot in uniformly spaced amounts, means for bringing the cooperative parts of said independent means into cooperative relation to effect fashioning operations on stock disposed in said slot, and means for advancing the stock intermediate cooperation of said cooperative parts in an amount equal to the uniform spacing of said cooperative parts one from the other to thereby advance a given portion of said stock from association with one set of cooperative parts into association with the succeeding cooperative parts in the direction of advance of said stock.

11. In a machine tool for making small but difficult products from relatively thin stock, a frame, a guide block mounted in said frame and having a plurality of parallel guideways formed therein, said block having a stock receiving slot formed therein and extended across said guideway, fashioning means comprising a plurality of independent means for effecting fashioning operations on stock passed into said slot, the independent means including cooperative elements and being respectively mounted in said guideways to thereby insure accurate alignment between the cooperative parts of said cooperative elements, one element of each of said independent means being disposed in a guideway on one side of said slot and the other of the elements being disposed in such guideway on the other side of said slot, said guideways and said independent means being constructed and arranged to dispose the cooperative parts of said independent means from one another along said stock receiving slot in uniformly spaced amounts, means for simultaneously bringing the cooperative parts of said independent means into cooperative relation to effect fashioning operations on stock disposed in said slot, means for advancing the stock intermediate cooperation of said cooperative parts in an amount equal to the uniform spacing of said cooperative parts one from the other to thereby advance a given portion of said stock from association with one of said cooperative parts into association with the succeeding cooperative parts in the direction of advance of said stock, and means for timing the operation of the means for bringing the cooperative parts into cooperative relation and the means for advancing the stock to thereby insure advance of the stock intermediate the cooperation of the cooperative parts with each other.

12. In a machine tool for making small but difficult products from relatively thin stock, a frame, a guide block mounted in said frame and having a plurality of parallel guideways formed therein, said block having a stock receiving slot formed therein and extended across said guideway, fashioning means comprising perforating means, slitting means, notching means and cropping means, the perforating, slitting, notching and cropping means each being mounted in one of said guideways and each comprising cooperative elements of which one is mounted in the guideway on one side of said slot and of which another is normally disposed in said guideway on the other side of said slot, and means for operating all of said fashioning means simultaneously whereby such means perform their separate functions on different portions of said stock at the same time, the perforating, slitting, notching and cropping means being uniformly spaced one from the other, and means for advancing the stock through the machine in a step by step manner in steps equal to such uniform spacing of such means.

13. In a machine tool for making small but difficult products from relatively thin stock, a frame, a guide block mounted in said frame and having a plurality of parallel guideways formed therein, said block having a stock receiving slot formed therein and extended across said guideway, fashioning means comprising perforating means, slitting means, notching means and cropping means, the perforating, slitting, notching and cropping means each being mounted in one of said guideways and each comprising cooperative elements of which one is mounted in the guideway on one side of said slot and of which another is normally disposed in said guideway on the other side of said slot, means for operating all of said fashioning means simultaneously whereby such means perform their separate functions on different portions of said stock at the same time, the perforating, slitting, notching and cropping means being uniformly spaced one from the other, means for advancing the stock through the machine in a step by step manner in steps equal to such uniform spacing of such means, and positioning means associated with the fashioning means for accurately positioning said stock relative thereto during operation thereof.

14. In a machine tool for making small but difficult products from relatively thin material, means for automatically feeding said material through said machine in a step by step manner, means for predetermining the extent of advance of said material in each step, a head comprising a frame, a plurality of fashioning dies, a plurality of reciprocable fashioning punches, a common guide means rigidly secured in said frame and in which said dies are fixedly secured and said punches are reciprocably secured in alignment with said dies, a holding sleeve frictionally engaging one of said punches and adapted to engage said material prior to the engagement thereof by said one punch to hold said material during the punching thereof, means limiting the disengaging movement of said sleeve to less than the disengaging movement of said one punch, positioning means in said guide means for positioning said material in predetermined relation with said dies and punches during the step by step movement thereof, a source of power, a drive shaft operatively connected to said feeding means, means operatively connecting said power source and said drive shaft, translating means for translating the rotary motion of said drive shaft to reciprocatory motion, and means interconnecting said translating means and said punches to reciprocate said punches during an at-rest period in the step by step movement of said material.

15. In a machine tool for making small but difficult products from relatively thin material, means for automatically feeding said material through said machine in a step by step manner, means for predetermining the extent of advance of said material in each step, a head comprising a frame, a plurality of fashioning dies, a plurality of reciprocable fashioning punches, a common guide means rigidly secured in said frame and in which said dies are fixedly secured and said punches are reciprocably secured in alignment with said dies, a holding sleeve frictionally engaging one of said punches and adapted to engage said material prior to the engagement thereof by said one punch to hold said material during the punching thereof, means limiting the disengaging movement of said sleeve to less than the disengaging movement of said one punch, positioning means in said guide means for positioning said material in predetermined relation with said dies and punches during the step by step movement thereof, a source of power, a drive shaft operatively connected to said feeding means, means operatively connecting said power source and said drive shaft, translating means for translating the rotary motion of said drive shaft to reciprocatory motion, and common means interconnecting said translating means and each of said punches to reciprocate said punches simultaneously during an at-rest period in the step by step movement of said material.

16. In a machine tool for making small but difficult products from relatively thin strip material, means for fashioning said products from said material, means for intermittently feeding said material to and through said fashioning means and comprising a slide, clamp means secured to said slide, a carriage reciprocably mounted on said slide, clamp means on said carriage, relatively weak spring means interconnecting said slide and said carriage to normally hold said carriage in retracted position, a drive shaft for operating said fashioning means, a cam on said drive shaft, an arm pivotally mounted on said carriage, a roller on said arm adapted to engage said cam, relatively strong spring means interconnecting said arm and said carriage to hold said roller in engagement with said cam, and means limiting movement of said material into said fashioning means, whereby said cam effects feeding movement of said carriage against the action of said weak spring means and the clamp means on said carriage grips said material to feed said material to said limiting means whereupon further feeding movement of said material and said carriage is arrested and said cam then causes pivotal movement of said arm against the action of said strong spring and said return movement of said carriage is effected by said relatively weak spring, the clamp means on said slide gripping said material to hold the same against return movement and the clamp means on said carriage being ineffective on return movement thereof.

17. In a machine tool for making small but difficult products from relatively thin strip material, means for fashioning said products from said material, means for intermittently feeding said material to and through said fashioning means and comprising a slide, clamp means secured to said slide, a carriage reciprocably mounted on said slide, clamp means on said carriage, relatively week spring means interconnecting said slide and said carriage to normally hold said carriage in retracted position, a drive shaft for operating said fashioning means, a cam on said drive shaft, an arm pivotally mounted on said carriage, a roller on said arm adapted to engage said cam, relatively strong spring means interconnecting said arm and said carriage to hold said roller in engagement with said cam, a stop for limiting the strong spring means actuated movement of said arm, and means limiting movement of said material into said fashioning means, whereby said cam effects feeding movement of said carriage against the action of said weak spring means and the clamp means on said carriage grips said material to feed said material to said limiting means whereupon further feeding movement of said material and said carriage is arrested and said cam then causes pivotal movement of said arm against the action of said strong spring and said return movement of said carriage is effected by said relatively weak spring, the clamp means on said slide gripping said material to hold the same against return movement and the clamp means on said carriage being ineffective on return movement thereof.

18. In a machine tool for making products from relatively thin strip material and including means for fashioning said products from said material, the combination of means for intermittently feeding strip material in a predetermined amount to and through said fashioning means and including a carriage mounted for reciprocal movement in an amount greater than the predetermined amount the strip material is to be fed and adapted to engage and feed said material, a drive shaft for operating said fashioning means, a cam on said drive shaft, an arm pivotally mounted on said carriage and having a cam follower thereon adapted for cooperation with said cam, means for limiting movement of the strip material to and through said fashioning means, spring means operable to urge said carriage in one direction, and other spring means secured to said arm and said carriage and operable to maintain said cam follower in cooperation with said cam, said cam, cam follower, arm and the other spring means being operative to move said carriage against the action of the first named spring means, said other spring means yielding when the material engages the means limiting movement thereof to prevent further feeding movement of said carriage when the strip means has been moved in said predetermined amount so as to avoid damamge to said carriage and buckling of said material.

19. In a machine tool, a guide block having a channel of predetermined cross-section formed therein and in which a punch and die assembly may be secured to insure accurate alignment of the parts of the assembly adapted for cooperation with other, the die part of said assembly including at least one die opening and having a portion thereof formed complementary to the cross-section of said channel to be accurately positionable therein, the punch part of said assembly including at least one punch adapted for cooperation with a die opening in the die part of said assembly and having a portion thereof formed complementary to the cross-section of said channel to be accurately positionable therein, operating means for reciprocating a punch in the punch part of the assembly to and from cooperation with a cooperating die opening in the die part of the assembly, means detachably connecting a punch in the punch part of the assembly to the operating means, said guide block having a stock receiving slot therein extended transversely across said channel, and fastening means for detachably securing the portions of said punch and die assembly formed complementary to said channel in said channel and with a die opening in the die part of one side of said slot and the punch in the punch part adapted for cooperation with such die opening normally disposed on the other side of said slot, said fastening means being releasable from the punch and die parts of said assembly to permit removal thereof from said channel.

20. In a machine tool, a guide block having a channel of predetermined cross-section formed therein, a die assembly including at least one die opening and having a portion thereof formed complementary to the cross-section of said channel to be accurately positionable therein, a punch assembly including at least one punch adapted for cooperation with a die opening in the die assembly and having a portion thereof formed complementary to the cross-section of said channel to be accurately positionable therein, operating means for reciprocating a punch in the punch part of the assembly to and from cooperation with a die opening in the die part of the assembly, said guide block having a stock receiving slot therein extending transversely across said channel, common means for detachably securing the punch and die assemblies in said channel with the complementary portions thereof seated in the channel and with a die opening in the die assembly on one side of said slot and with a punch in the punch assembly adapted for cooperation with such die opening normally disposed on the other side of said slot, and means for detachably connecting a punch in the punch assembly to the operating means therefor whereby upon release of said common means the punch and die assemblies may be removed from said channel.

21. In a machine tool, a guide block having a channel of predetermined cross-section formed therein, a die assembly including at least one die opening and having a portion thereof formed complementary to the cross-section of said channel to be accurately positionable therein, a punch assembly including at least one punch adapted for cooperation with a die opening in the die assembly and having a portion thereof formed complementary to the cross-section of said channel to be accurately positionable therein, operating means for reciprocating a punch in the punch part of the assembly to and from cooperation with a die opening in the die part of the assembly, said guide block having a stock receiving slot therein extending transversely across said channel, fastening means for securing the die assembly in said channel with the complementary portions thereof seated in such channel and releasable to permit removal of said die assembly from said channel, other fastening means securing said punch assembly in said channel with the complementary portions thereof seated in said channel, and means for detachably connecting a punch in said punch assembly to the operating means therefor whereby upon release of said other fastening means said punch assembly may be removed from said channel.

WALTER T. GOLLWITZER.